United States Patent
Jinno et al.

[11] Patent Number: 6,161,070
[45] Date of Patent: Dec. 12, 2000

[54] PASSENGER DETECTION SYSTEM

[75] Inventors: Kazunori Jinno, Tokyo; Masahiro Ofuji, Kanagawa, both of Japan

[73] Assignee: NEC Home Electronics, Inc., Tokyo, Japan

[21] Appl. No.: 09/145,309

[22] Filed: Aug. 31, 1998

Related U.S. Application Data

[63] Continuation-in-part of application No. 08/606,175, Feb. 23, 1996, Pat. No. 5,948,031.

[30] Foreign Application Priority Data

Sep. 3, 1997 [JP] Japan ................................. 97-238272

[51] Int. Cl.$^7$ ..................................................... B60R 21/00
[52] U.S. Cl. .............................................. 701/45; 280/735
[58] Field of Search ...................... 701/45, 46, 47; 280/728.1, 732, 734, 735; 180/268, 271, 272; 340/438, 457.1, 500

[56] References Cited

U.S. PATENT DOCUMENTS

| | | |
|---|---|---|
| 3,219,925 | 11/1965 | Borley et al. . |
| 3,732,538 | 5/1973 | Gillund et al. . |
| 3,740,567 | 6/1973 | Atkins . |
| 3,781,672 | 12/1973 | Maltby et al. . |
| 3,843,924 | 10/1974 | Wahlgren . |
| 3,863,209 | 1/1975 | Hollins . |
| 5,002,308 | 3/1991 | Lenzen et al. . |

(List continued on next page.)

FOREIGN PATENT DOCUMENTS

| | | |
|---|---|---|
| 0302727A2 | 2/1989 | European Pat. Off. . |
| 0441381A1 | 8/1991 | European Pat. Off. . |
| 0609021A2 | 8/1994 | European Pat. Off. . |
| 4417827A1 | 11/1995 | Germany . |
| 60025475 | 2/1985 | Japan . |
| 63094102 | 4/1988 | Japan . |
| 63241402 | 10/1988 | Japan . |
| 1573582 | 8/1980 | United Kingdom . |
| WO90/16045 | 12/1990 | WIPO . |
| WO92/09063 | 5/1992 | WIPO . |
| WO94/23974 | 10/1994 | WIPO . |
| WO95/21752 | 8/1995 | WIPO . |

(List continued on next page.)

OTHER PUBLICATIONS

Magid, L. M. *Electromagnetic Fields, Energy and Waves* (1972), p. 26, published in US.

Paradiso, J. and N. Gershenfeld. "Musical Applications of Electric Field Sensing" (Oct. 1995) to be submitted to Computer Music Journal, pp. 1–25, published in US.

Zimmerman, T. G. et al. "Applying Electric Field Sensing to Human–Computer Interfaces" (Oct. 6, 1994), 8 pages, published in US.

*Primary Examiner*—William A. Cuchlinski, Jr.
*Assistant Examiner*—Edward Pipala
*Attorney, Agent, or Firm*—Craig A. Summerfield; Brinks Hofer Gilson & Lione

[57] ABSTRACT

A passenger detection system including a single antenna electrode mounted on a surface of a passenger seat in an automobile. An oscillator generates an AC current having a predetermined voltage amplitude that is transmitted to the antenna electrode to produce a minute electric field around the antenna electrode. An amplitude control circuit is used to control the voltage amplitude of the output signal from the oscillator. The electrical characteristics of an object on the passenger seat alter the current and phase of the signal in the antenna electrode. A current detection circuit detects the amount of current flowing from the oscillator to the antenna electrode. In addition, a phase differential detection circuit detects a phase differential between the output signal from the oscillator and the signal on the antenna electrode. A control circuit detects the presence or absence of a passenger seated in the seat based on a current signal output from the current detection circuit and a phase differential signal output from the phase differential detection circuit. A control unit including the oscillator, the amplitude control circuit, the current detection circuit, the phase differential detection circuit and the control circuit, is contained in a single housing that is mounted under the passenger seat.

18 Claims, 14 Drawing Sheets

U.S. PATENT DOCUMENTS

| | | |
|---|---|---|
| 4,136,291 | 1/1979 | Waldron . |
| 4,208,695 | 6/1980 | Noda et al. . |
| 4,305,074 | 12/1981 | Barzana et al. . |
| 4,614,937 | 9/1986 | Poujois . |
| 4,621,258 | 11/1986 | Campman . |
| 4,688,141 | 8/1987 | Bernard et al. . |
| 4,700,973 | 10/1987 | Gademann et al. . |
| 4,796,013 | 1/1989 | Yasuda et al. . |
| 4,885,566 | 12/1989 | Aoki et al. . |
| 4,887,024 | 12/1989 | Sugiyama et al. . |
| 4,958,129 | 9/1990 | Poduje et al. . |
| 4,972,154 | 11/1990 | Bechtel et al. . |
| 4,980,519 | 12/1990 | Mathews . |
| 5,071,160 | 12/1991 | White et al. . |
| 5,074,583 | 12/1991 | Fujita et al. . |
| 5,087,825 | 2/1992 | Ingraham . |
| 5,130,672 | 7/1992 | Watkiss et al. . |
| 5,134,379 | 7/1992 | Maher et al. . |
| 5,161,820 | 11/1992 | Vollmer . |
| 5,166,679 | 11/1992 | Vranish et al. . |
| 5,189,417 | 2/1993 | Caldwell et al. . |
| 5,214,388 | 5/1993 | Vranish et al. . |
| 5,225,959 | 7/1993 | Stearns . |
| 5,232,243 | 8/1993 | Blackburn et al. . |
| 5,247,261 | 9/1993 | Gershenfeld . |
| 5,247,281 | 9/1993 | Facon et al. . |
| 5,305,017 | 4/1994 | Gerpheide . |
| 5,330,226 | 7/1994 | Gentry et al. . |
| 5,366,241 | 11/1994 | Kithil . |
| 5,400,487 | 3/1995 | Gioutsos et al. . |
| 5,404,128 | 4/1995 | Ogino et al. . |
| 5,410,297 | 4/1995 | Joseph et al. . |
| 5,413,378 | 5/1995 | Steffens, Jr. et al. . |
| 5,431,438 | 7/1995 | Manabe . |
| 5,432,671 | 7/1995 | Allavena . |
| 5,439,249 | 8/1995 | Steffen, Jr. et al. . |
| 5,442,347 | 8/1995 | Vranish . |
| 5,446,661 | 8/1995 | Gioutsos et al. . |
| 5,463,388 | 10/1995 | Boie et al. . |
| 5,467,022 | 11/1995 | Aoki et al. . |
| 5,482,314 | 1/1996 | Corrado et al. . |
| 5,494,311 | 2/1996 | Blackburn et al. . |
| 5,515,933 | 5/1996 | Meyer et al. . |
| 5,525,843 | 6/1996 | Höwing . |
| 5,554,973 | 9/1996 | Kawashima et al. . |
| 5,602,734 | 2/1997 | Kithil . |
| 5,605,348 | 2/1997 | Blackburn et al. . |
| 5,618,056 | 4/1997 | Schoos et al. . |

FOREIGN PATENT DOCUMENTS

| | | |
|---|---|---|
| WO96/09193 | 3/1996 | WIPO . |
| WO96/36134 | 11/1996 | WIPO . |
| WO97/31238 | 8/1997 | WIPO . |
| WO97/41458 | 11/1997 | WIPO . |

OSCILLATION OUTPUT 29b1Q̄

ELECTRODE SIGNAL 29b2Q̄

PHASE DIFFERENTIAL

OSCILLATION

ELECTRODE 29b2Q̄

29b1Q̄

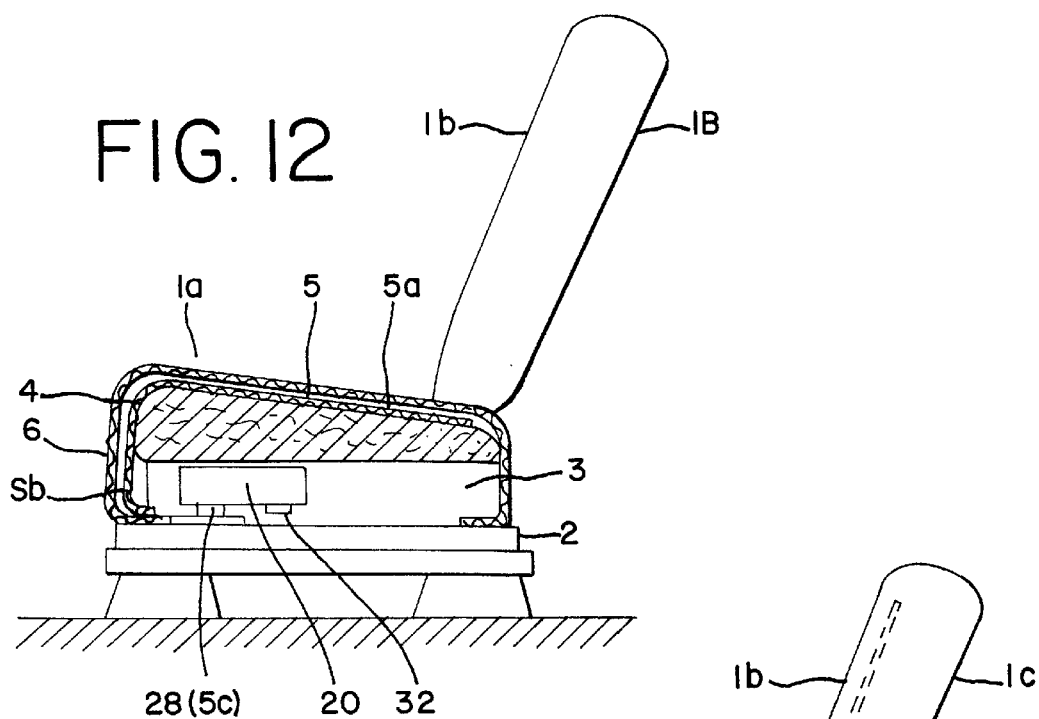
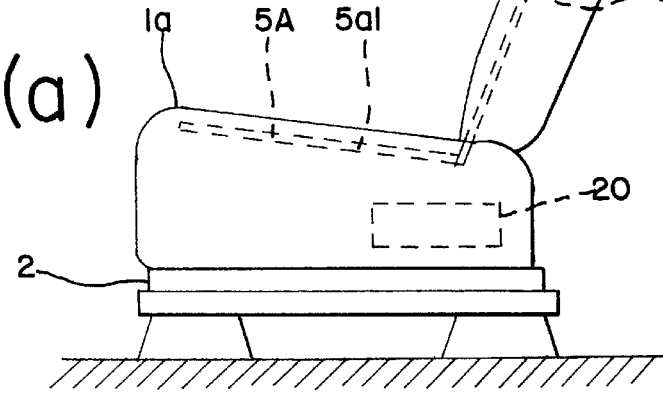
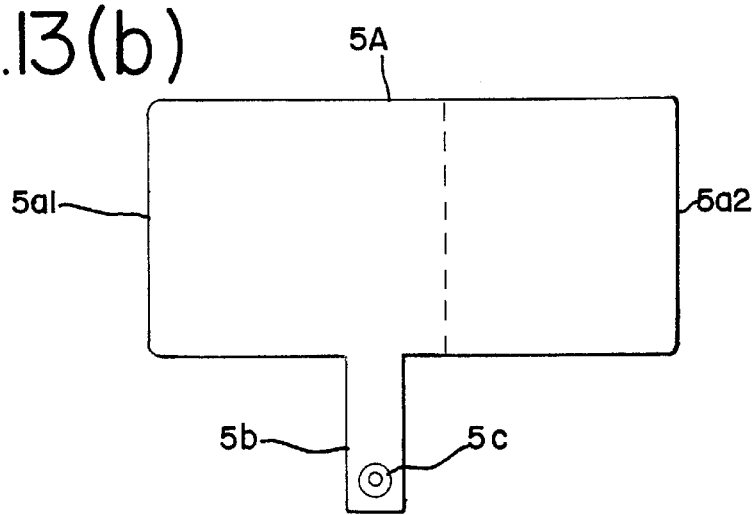

PASSENGER DETECTION SYSTEM

CROSS-REFERENCE TO RELATED APPLICATIONS

The present application is a continuation-in-part of U.S. application Ser. No. 08/606,175 entitled "VEHICLE PASSENGER SENSING SYSTEM AND METHOD", which was filed on Feb. 23, 1996 and subsequently filed as a Continued Prosecution Application on Jun. 19, 1998, now U.S. Pat. No. 5,948,031.

BACKGROUND

1. Field of the Invention

The present invention is related to passenger detection systems, and in particular to passenger detection systems that can readily detect the presence of a passenger in the front passenger seat of an automobile in which a passenger-side air bag device is installed.

2. Description of the Prior Art

In general, air bag devices are used to ease the shock that a passenger experiences during an automobile collision, and as such must be stored in a stable condition in the automobile. Air bags are typically installed in front of the driver's seat, but there has been a recent trend toward installing a second air bag device in front of the front passenger seat.

FIG. 14 shows a prior art air bag control system for controlling the deployment of driver-side and passenger-side air bag devices. The control system includes a control circuit CC that receives a signal from an electrical acceleration sensor (shock detection sensor) GS, and transmits control signals to the gates of normally-open semiconductor switching elements SW1 and SW2. Switching elements SW1 and SW2 are respectively connected in parallel paths between a system operating voltage and ground. The first path includes a safing sensor SS1, a squib circuit SQ1 and the switching element SW1. The second path includes a safing sensor SS2, a squib circuit SQ2 and the switching element SW2. The safing sensors SS1 and SS2 are respectively mounted on the driver's seat and the front passenger seat, and each includes an acceleration detection mechanism that closes a normally-open switch in response to sudden acceleration (deceleration) of the respective seat. Squib circuits SQ1 and SQ2 are connected to the gas sources of the air bag devices respectively mounted on the automobile in front of the driver's seat and the front passenger seat.

In operation, the prior art air bag control system only deploys the driver-side and passenger side air bags when both of the safing sensors SS1 and SS2 close, and when the electrical acceleration sensor GS closes. In particular, the acceleration detection mechanisms of the safing sensors SS1 and SS2 close their respective normally-open switches in response to an acceleration that is relatively small in comparison to the acceleration necessary to close the electrical acceleration sensor GS. When closed, the safing sensors SS1 and SS2 apply a high voltage signal to the control circuit CC and to first terminals of the squib circuits SQ1 and SQ2. The high voltage signals from the safing sensors SS1 and SS2 cause the control circuit CC to enter into an operational mode. Next, the control circuit CC confirms that the automobile is in an accident based on the signal from the electrical acceleration sensor GS. If the electrical acceleration sensor GS also detects the acceleration, thereby confirming that the automobile is actually in a collision, then the control circuit CC transmits control signals that close the switching elements SW1 and SW2. As a result, current flows from the system operating voltage to ground through each of the squib circuits SQ1 and SQ2, thereby causing respective gas sources to deploy (inflate) the driver-side air bag and the passenger-side air bag. Once deployed, the air bags protect the driver and passenger from the shock of the collision.

The air bag control system is designed to protect an adult passenger during a collision, but can cause serious injury when deployed while a child or infant is in the front passenger seat. Referring to FIG. 15(a), a passenger-side air bag is typically designed to deploy in front of the torso of an adult passenger P seated in the front passenger seat 1, thereby cushioning the forward acceleration of the adult passenger P during a collision. However, as shown in FIG. 15(b), if an infant (small passenger) SP is in a rear facing infant seat (hereafter abbreviated RFIS) 1A that is located on the front passenger seat 1, deployment of the passenger-side air bag can force the RFIS 1A toward the seat back, which can injure the infant. Consequently, when an RFIS is located on the front passenger seat, it is desirable for the passenger-side air bag not to deploy even if the automobile is in a collision. In addition, as shown in FIG. 15(c), the head of a child SP seated in a forward facing child seat (hereafter abbreviated FFCS) 1A is typically lower and further forward than that of an adult passenger P, so that the deploying air bag can injure the child SP. Consequently, it is also desirable for the passenger-side air bag not to deploy when a FFCS is used, even in the event of a collision.

FIG. 16 shows a prior art air bag control system that prevents deployment of the passenger-side air bag when an RFIS or FFCS is used. This air bag control system includes a passenger detection sensor SD for detecting whether or not a passenger is seated in the front passenger seat. Further, based on the detection signal from sensor SD, the control circuit CC determines whether the passenger seated in the front passenger seat is an adult or a child. The air bag control system deploys the air bag during a collision only if sensor SD generates a detection signal that indicates an adult passenger is seated in the front passenger seat.

Several passenger detection sensor types have been proposed for implementing sensor SD in the air bag control system of FIG. 16. Such proposed sensors include a weight-based unit that measures the weight applied to the front passenger seat, and an optics-based unit that determines whether the passenger is an adult P or a child SP by generating an image of the passenger seated in the seat, and then processing the image.

The weight-based sensor unit provides a broad determination about whether the passenger in a front passenger seat is an adult or a child based on the weight applied to the seat, but cannot distinguish between an adult/child and an inanimate object. In particular, the air bag control system prevents deployment of the air bag when the detected weight is less than that associated with an adult. However, although this can avoid undesirable circumstances during an automobile collision when a small child is seated in the front passenger seat, the weight-based unit may incorrectly deploy for a heavy child, or fail to deploy for a light-weight adult. Further, if a heavy object (such as a bag of groceries) is placed on the seat, the air bag device may be needlessly deployed in an accident.

The optical-based sensor unit can provide very accurate determinations about the passenger seated in the front passenger seat by processing the image data taken by the camera and then comparing the processed data with various patterns. For example, the image data may be compared with data consistent with an adult passenger, a child in a RFIS, or a child in a FFCS. However, this unit has a problem in that it is very expensive and the processing equipment is very complex.

SUMMARY OF THE INVENTION

The present invention is directed to an inexpensive passenger detection system that accurately detects the presence of a passenger in the front passenger seat. The passenger detection system utilizes an oscillation circuit that causes a single antenna electrode to emit an electric field that is disrupted by the electrical characteristics of an object placed on the passenger seat. This disruption alters the current and phase of the signal in the antenna electrode. By comparing the current flowing in the antenna electrode and the difference between the phase of the signal in the antenna electrode and the oscillation circuit output signal with predetermined threshold values, it is possible to detect the presence of a passenger in a reliable and inexpensive manner.

In accordance with an embodiment of the present invention, the passenger detection system includes a seat, at least one antenna electrode positioned effectively on a surface of the seat, an oscillation circuit used to emit a minute electric field in the area of the antenna electrode, a current detection circuit that detects current flowing from the oscillation circuit to the antenna electrode, based on the minute electric field emitted in the area of the antenna electrode, a phase differential detection circuit that detects phase differential between the signal sent from the oscillation circuit and the signal output to the antenna electrode, and a control circuit that announces the presence or absence of a person sitting in the seat, based on the signal output of the current detection circuit and the phase differential detection circuit.

In accordance with another embodiment of the present invention, the passenger detection system includes a seat, an antenna electrode positioned effectively on the surface of the seat, an oscillator used to emit a minute electric field in the area of the antenna electrode, an amplitude control circuit that controls the voltage amplitude of the signal sent from the oscillator to the antenna electrode so as to make it stable, a current detection circuit that detects the current flowing from the oscillator through the amplitude control circuit and to the antenna electrode as a result of the minute electric field, a phase differential detection circuit that detects phase differential between the output signal from the oscillator and the signal on the antenna electrode, and a control circuit that announces the presence or absence of a person sitting in the seat, based on the output signal from the current detection circuit and the phase differential detection circuit.

BRIEF DESCRIPTION OF THE DRAWINGS

FIGS. 3(a) and 3(b) are simplified block diagrams, wherein FIG. 3(a) shows the passenger detection system in accordance with the second embodiment, and FIG. 3(b) shows an air bag control system connected to the passenger detection system.

FIGS. 6(a), 6(b) and 6(c) are waveform diagrams showing the operation of the phase differential detection circuit shown in FIG. 5(a), wherein FIG. 6(a) shows the output signal waveform for the first flip flop circuit, FIG. 6(b) shows the output signal waveform for the second flip flop circuit, and 5(c) shows the phase differential between the output signals from the first and second flip flop circuits.

FIG. 12 is a cross-sectional side view of a seat incorporating the necessary parts of the passenger detection system of the third embodiment.

FIGS. 13(a) and 13(b) show side and top views of an antenna electrode incorporated into a seat in the passenger detection system of the third embodiment.

FIGS. 15(a), 15(b) and 15(c) are side views showing various seating arrangements, wherein FIG. 15(a) shows a seated adult passenger, FIG. 15(b) shows an rear facing infant seat (RFIS), and FIG. 15(c) shows a front facing child seat (FFCS).

FIGS. 17(a) and 17(B) are diagrams showing the basic operation of a passenger detection system utilizing electric field transmissions, wherein FIG. 17(a) shows an undisturbed electrical field distribution between two electrodes, and FIG. 17(b) shows an electrical field distribution when an object is present between the two electrodes.

DETAILED DESCRIPTION OF THE INVENTION

FIGS. 17–21 show a first embodiment of the present invention that utilizes two or more electrodes to detect the presence of a passenger in the front passenger seat of a vehicle.

Figure 17A:
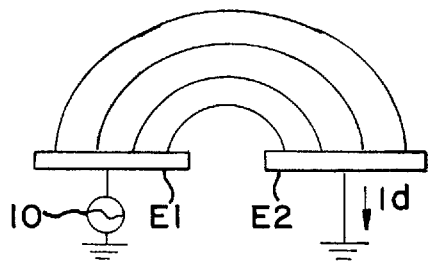
Figure 17B:
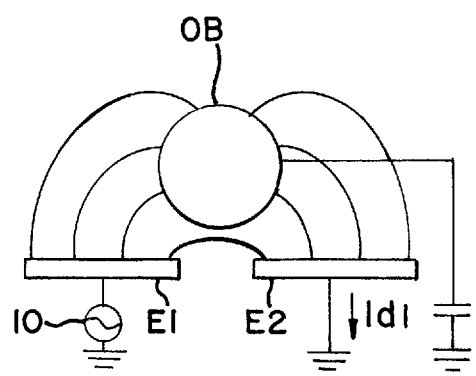

Referring to FIGS. 17(a) and 17(b), this passenger detection system detects the disturbances in minute electric fields between two electrodes positioned in the passenger seat. As shown in FIG. 17(a), an electric field is created as a result of the potential difference between the electrode E1 and the electrode E2 when a high-frequency, low-voltage signal is transmitted to electrode E1 from an oscillation circuit 10, and the electrode E2 is connected to a ground. This electric field produces a current Id flowing from the electrode E2 to ground. With this arrangement, as shown in FIG. 17(b), if a body OB is present in the electric field, disturbances in the electric field will occur, and an altered current Id1 (i.e., different from the current Id) will flow from electrode E2 to ground.

As indicated in FIG. 17(b), most objects OB act as a capacitor having one terminal connected to ground, and can be described electrically in terms of conductance and capacitance. Therefore, when an object OB is in the automobile seat, changes in the current flowing from electrode E2 will occur based on the electrical characteristics of the object OB. Using this phenomenon, the presence of a person in the seat can be detected by comparing the detected current with a known value. In particular, by augmenting the electrode, considerable information about the object in the seat can be obtained, including whether or not the object is an adult-sized person sitting normally in the seat. Therefore, the presence of a passenger in the seat can be precisely detected.

FIGS. 18–21 show a passenger detection system utilizing the electric field phenomenon in accordance with a first embodiment of the present invention. In accordance with the first embodiment, a first electrode (referred to below as the "transmitter electrode") is coupled to an oscillation circuit, and the other three electrodes (referred to below as "receiver electrodes") are utilized to detect the electric field emitted by the transmitter electrode. The amount of current generated in each receiver electrode is determined by the object (if any) located in the "path" between that receiver electrode and the transmitter electrode. Precise identification of any such object, such as an adult passenger, an infant in a RFIS or a child in a FFCS, is obtained based on the detected currents.

Figure 18:
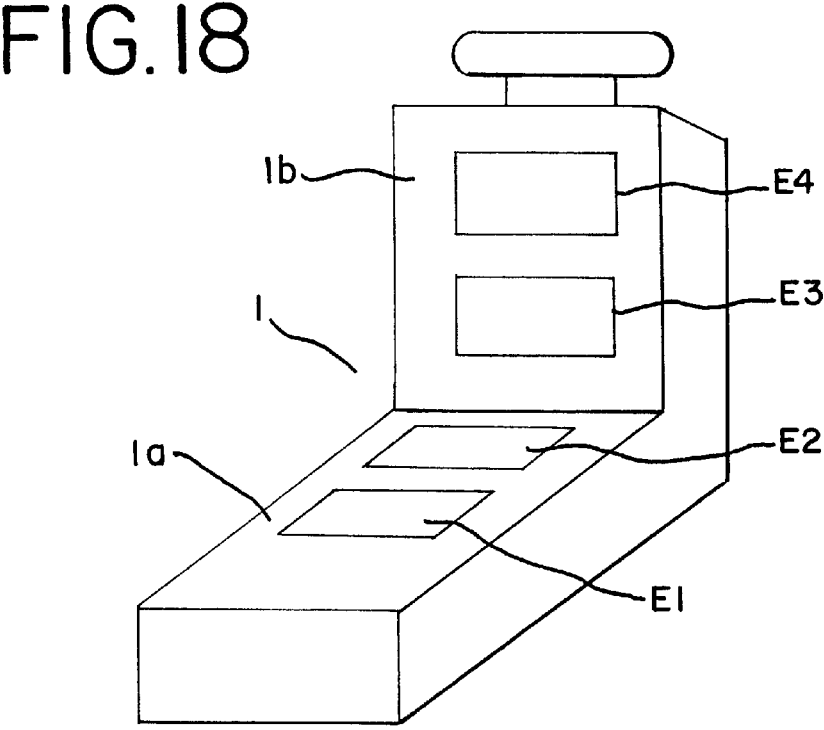
FIG. 18 is a perspective view showing a seat in the passenger detection system according to a first embodiment of the present invention.

FIG. 18 is a perspective view showing a seat 1 incorporating electrodes E1 through E4 of the passenger detection system in accordance with the first embodiment, which are formed from rectangular sheets of conductive material. Specifically, the electrodes E1 and E2 are mounted on the base portion 1a of the seat 1, and the electrodes E3 and E4 are mounted on the back portion 1b. These electrodes are positioned with respect to anticipated seating positions of a passenger, and are mounted to facilitate seating comfort. For example, the electrodes E1 through E4 include metal fibers sewn into the seat cover fabric, conductive paint applied to the surface of the seat, or metal plates installed under the seat cushion. The electrodes E1 through E4 are connected to the remainder of the passenger detection circuit as shown in FIGS. 19 and 20.

Figure 19:
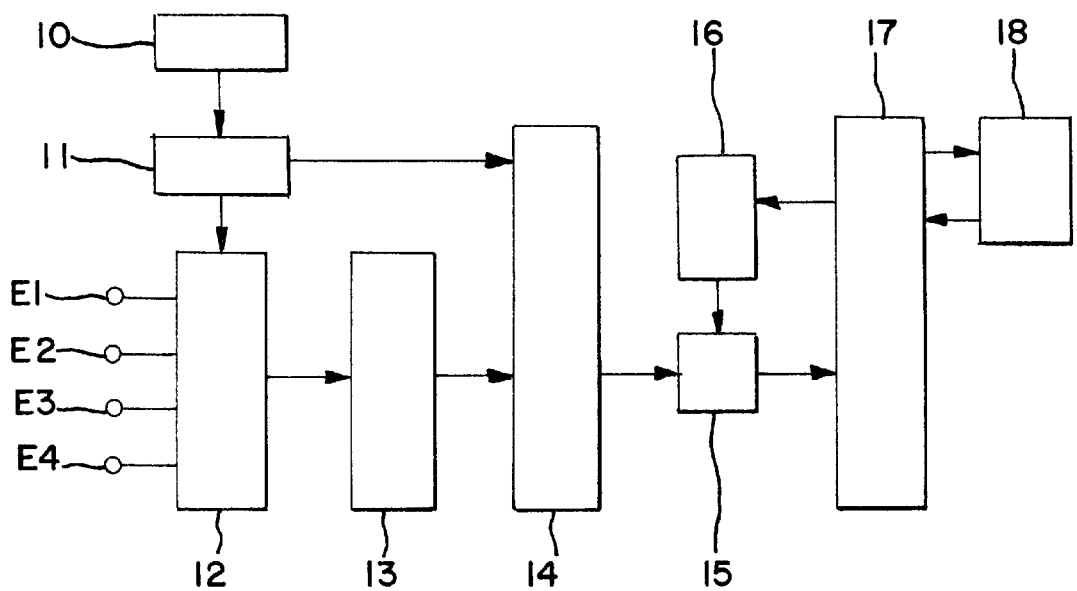
FIG. 19 is a block diagram showing the passenger detection system according to the first embodiment.

FIG. 19 is a block diagram showing the main components of the passenger detection system according to the first embodiment. An oscillation circuit 10 generates a frequency of about 100 kHz in the range of 10 to 12 volts that is passed through a load current detection circuit 11 to a send/receive switching circuit 12. The send/received switching circuit 12 selectively connects one of the electrodes E1 through E4 to the oscillation circuit 10 to emit the electric field, and the remaining electrodes to a current-to-voltage conversion circuit 13 that generates voltage signals indicative of the detected currents. The current-to-voltage circuit 13 also amplifies the voltage signals and transmits them to a detection circuit 14. The detection (demodulation) circuit 14 includes a band pass filter to eliminate noise, and an AC-DC converter that converts the voltage signals to DC signals. The DC signals from the detection circuit 14 are transmitted through an amplification circuit 15, which is controlled by an offset conversion circuit 16, to a control circuit 17. The control circuit 17 generates safety restraint system (SRS) control signals that are transmitted to an air bag control system 18. The air bag control system 18 controls the deployment of a passenger side air bag device (not shown) in accordance with the SRS control signals, and also in accordance with acelleration sensor signals mounted on the vehicle.

Figure 20:
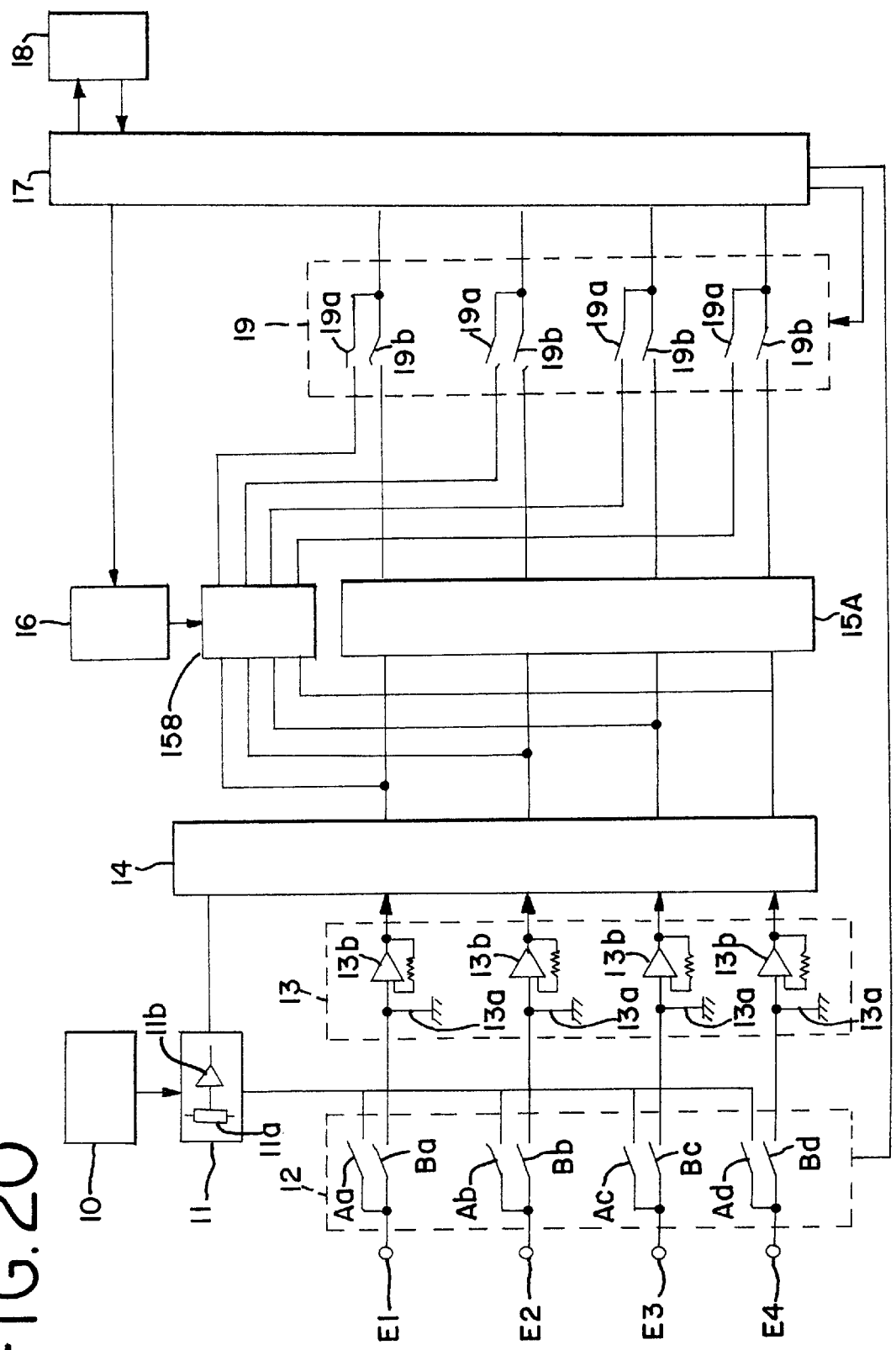
FIG. 20 is a simplified circuit diagram showing the passenger detection system of FIG. 19.
Figure 21:
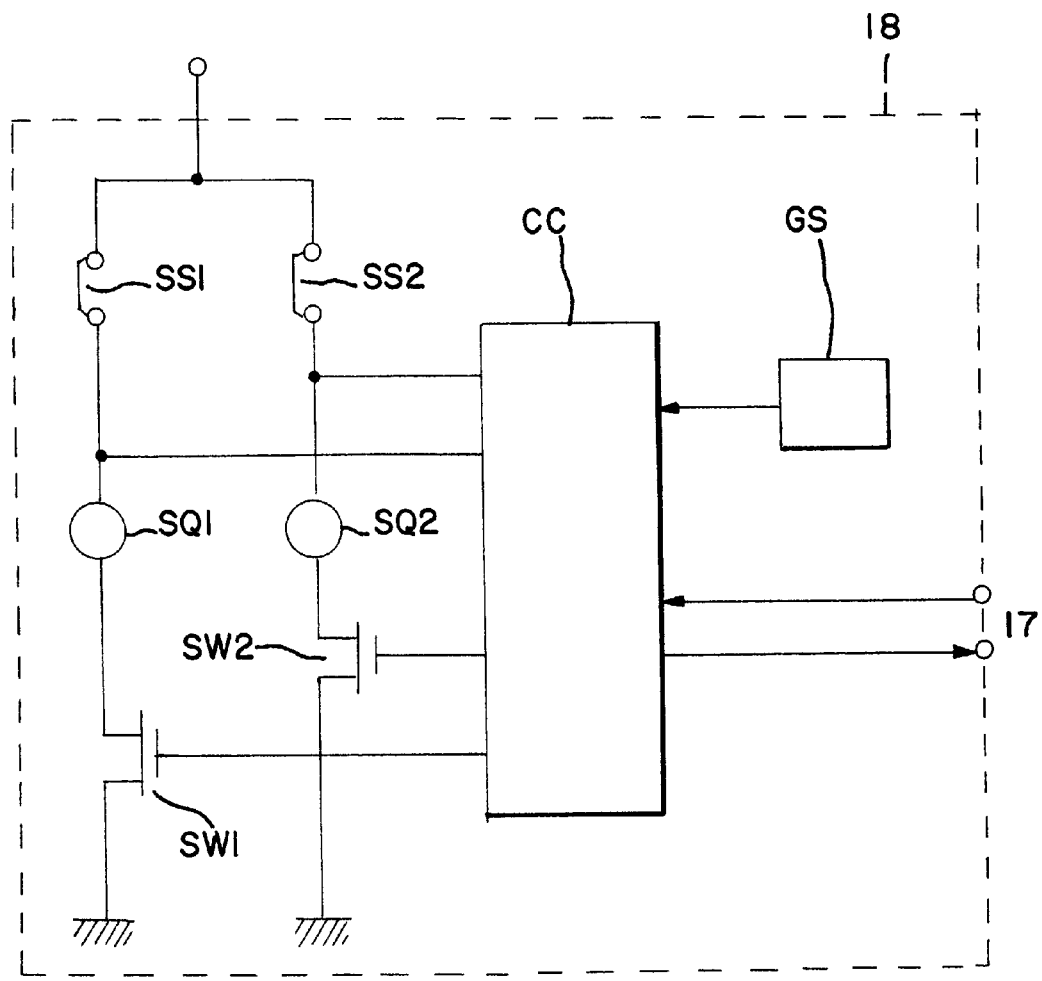
FIG. 21 is a simplified circuit diagram showing an air bag control system utilized with the passenger sensing system according to the first embodiment.

FIG. 20 is a circuit diagram showing the passenger detection circuit in additional detail. The circuit shown in FIG. 20 differs slightly from the block diagram of FIG. 19 as follows. First, the amplification circuit 15 is separated into a first amplification portion 15A and a second amplification portion 15B. Second, an analog switching circuit 19 is provided to selectively connect the signals from one of the amplification portions 15A and 15B to the control circuit 17. The control circuit 17 controls the analog selection circuit 19 to selectively switch between the low amplification gain (e.g., 1×) provided by the amplification portion 15A, and the high amplification gain (e.g., 100×) provided by the amplification portion 15B.

Referring to FIG. 20, the passenger detection circuit includes the oscillation circuit 10 that transmits the high-frequency, low-voltage signal to the load current detection circuit 11. The load current detection circuit 11 includes an impedance/resistance element 11a connected between the oscillation circuit 10 and the send/receive switching circuit 12. A voltage signal indicating the amount of current transmitted to the send/receive switching circuit 12 is amplified by an amplifier 11b and transmitted to the detection circuit 14. The send/receive switching circuit 12 is composed of switching elements Aa through Ad and switching elements Ba through Bd. Switching elements Aa through Ad are used to selectively connect one electrode (the transmitter electrode) from among the electrodes E1 through E4 to the output of the oscillation circuit 10 in response to a first control signal received from the control circuit 17. Switching elements Ba through Bd are used to connect the other electrodes (called the receiver electrodes) to the current-to-voltage conversion circuit 13 in response to a second control signal from the control circuit 17. In one embodiment, the send/receive switching circuit 12 is a multiplexer circuit. The current-to-voltage conversion circuit 13 includes an impedance/resistance element 13a that converts the differential potential currents flowing in the receiver electrodes to voltage signals, and an amplifier 13b that amplifies the converted voltage signals. The detection circuit 14 receives the output signal from the load current detection circuit 11 and the converted voltage signals from the receiver electrodes, and transmits DC signals representing these signals to both of the amplification portions 15A and 15B. The amplified output signals from the amplification portions 15A and 15B are transmitted to the analog selection circuit 19. The analog selection circuit 19 is composed of four switching elements 19a that are connected to receive the output from the second amplification circuit 15B, and switching elements 19a that are connected to receive the output from the first amplification circuit 15A. The analog selection circuit 19 transmits the output signals from one of the amplification circuits 15A and 15B through the switching elements 19a or 19b in response to a control signal received from control circuit 17.

A system constructed as described above functions as follows. First, only the switching element Aa of the send/receive switching circuit 12 is connected to the output of the oscillation circuit 10, based on the control signal from the control circuit 17. When the switching elements Bb through Bd are connected to the voltage-current switching circuit 13, the differential potential current flows to the receiver electrodes E2 through E4. These currents are converted to voltage by the impedance/resistance element 13a, amplified by the amplifier 13b, and then output to the detection circuit 14. The load current flowing to the send electrode E1 is detected by the load current detection circuit 11, and is output by the detection circuit 14 as the data R (1.1). In the detection circuit 13, the undesirable noise component is eliminated and the 100 kHz received signal is bandpassed, and the resulting voltage signal is output to the first and second amplification circuits 15A and 15B. The output signals from the first and second amplification circuits 15A and 15B are selected as appropriate by the operation of offset conversion circuit 16 and the analog selection circuit 19, and then output to the control circuit 17. For instance, when the output signal from the detection circuit 14 is strong, the switching elements 19b of the analog selection circuit 19 are selected to connect the output from the first (low) amplification circuit 15A to the control circuit 17. If the output signal is weak and measurement of minute changes in the received signal is difficult, the switching elements 19a of the analog selection circuit 19 are selected to connect the output from the second (high) amplification circuit 15B to the control circuit 17. The control circuit 17 stores the output signals from the first or second amplification circuits 15A and 15B.

Next, the switching element Aa of the send/receive switching circuit 12 is disconnected, and the switching element Ab is connected to the oscillation circuit 10, based on the signal from the control circuit 17. The resulting high-frequency, low-voltage signal applied to transmitter electrode E2 emits an electric field that generates currents in the receiver electrodes E1, E3 and E4. In addition, the switching elements Ba, Bc, and Bd are connected to the current/voltage conversion circuit 13 through switches Ba, Bc and Bd, respectively. The currents generated on receiver electrodes E1, E3 and E4 are converted to voltage signals and are output to the detection circuit 14. Note that the load current flowing to the send electrode E2 is detected by the load current detection circuit 11, and is output to the detection circuit 14 as the data R(2.2). In the manner described above, this is processed and stored as data in the control device 17.

Next, only the switching step Ac is connected to the output of the oscillation circuit 10. This applies a high-frequency, low-voltage signal to the transmitter electrode E3 from the oscillation circuit 10, which generates currents in receiver electrodes E1, E2 and E4. The generated currents are transmitted through the switching elements Ba, Bb and Bd to the current/voltage conversion circuit 13. The load current flowing to the transmitter electrode E3 is detected by the load current detection circuit 11, and is output to the detection circuit 14 as the data R(3.3). In the manner described above, these signals are processed and stored as data in the control device 17.

Next, only the switching step Ad is connected to the output of the oscillation circuit 10. This applies a high-frequency, low-voltage signal to the transmitter electrode E4 from the oscillation circuit 10, which generates currents in receiver electrodes E1, E2 and E3. The generated currents are transmitted through the switching elements Ba, Bb, and Bc to the current/voltage conversion circuit 13. The load current flowing to the transmitter electrode E4 is detected by the load current detection circuit 11, and is output to the detection circuit 14 as the data R(4.4). As described above, this is processed and stored as data in the control device 17.

The object seated on seat 1 is then identified based on mathematical processing of the data transmitted to the control circuit 17. In particular, the seating arrangements of an adult seated normally, an infant in a RFIS or a child in a FFCS are identified by comparing stored data with the data associated with the selected transmitter electrode/receiver electrode combinations of the electrodes E1 through E4. Based on this comparison, the applicable seating arrangement is identified and used to control the passenger-side air bag device.

The control circuit 17 stores data associated with the various seating patterns that are used to identify the object in the passenger seat. Specifically, experimentally determined data is stored for an empty seat, for a child seated in a FFCS, for an infant in a RFIS, and for an adult. This data, indicated by the general formula R(i,j), is obtained experimentally based on various combinations of the transmitter electrode and the receiver electrodes. Note that with the general formula R(i,j), i refers to transmitter electrode, and j refers to receiver electrode. In the control circuit 17, mathematical processing is performed using the sixteen data elements for each electrode, and the characteristics of the seating pattern are extracted. When the seating pattern is detected and identified in the control circuit 17, an appropriate signal is sent to the air bag control system 18. For instance, if the seating pattern is empty, FFCS, or RFIS, a signal is sent that will set the air bag device not to deploy, even in the event of a collision. For all other patterns, a signal is sent that sets the air bag device to deploy. These signals are input to the control circuit CC of the air bag control system 18 (see FIG. 21). For the former patterns, the control circuit CC is set to not provide the gate signal to the semiconductor switching element SW2 for the front passenger seat during a collision. Note that the gate signal is provided to the semiconductor switching element SW1 for the driver's seat. For the latter patterns, the control circuit CC is set to provide the gate signal to the semiconductor switching element SW1 and SW2. In accordance with the first embodiment, multiple electrodes E1 through E4 are arranged in the surface of the seat 1. The application of a high-frequency, low-voltage signal to a selected transmitter electrode produces a minute electric field that generates currents in the associated receiver electrodes. As a result, differential potential currents related to the seating pattern of an object in seat 1 flows from the receiver electrodes to the control circuit 17. Consequently, a characteristic pattern for the differential electric potential can be determined, resulting in reliable and accurate detection of the seating pattern associated with a passenger. As a result, the air bag device 18 can be set to deploy or not deploy, depending on the seating pattern of the passenger.

In addition, multiple electrodes can be arranged in mutually separate areas in the seat 1. As a result, the number of transmitter electrode/receiver electrode combinations can be increased, and the number of data patterns can also be increased. Thus, identification of the seating pattern of the passenger in the seat can be performed with even greater accuracy. Furthermore, the characteristic current patterns obtained from the current flowing from each receiver electrode, based on the seating patterns RFIS, FFCS, Person, and Empty, can be stored as seating patterns in the control circuit of the system. As a result, the receiver electrode signal data obtained from combinations of the transmitter electrodes and the receiver electrodes can be compared to the various seating patterns. By matching the applicable stored seating pattern, superior detection results can be obtained in comparison to the prior art weight-based methods.

In accordance with a second embodiment of the present invention, a passenger detection system is provided that detects the presence of a passenger based on the disruption of a minute electric field emitted in the area of a single antenna electrode. Specifically, an oscillation circuit generates an alternating current (AC) signal having a known voltage amplitude and frequency that is transmitted to an antenna electrode through an impedance/resistance element. The AC signal causes the electrode to emit the minute electric field in the area above the front passenger seat. The electrical characteristics of an object seated or placed on the front passenger seat (i.e., in the vicinity of the antenna electrode) disrupt the electric field. This electric field disruption alters the amount of current flowing in the antenna electrode and causes the phase of the AC signal generated on the antenna electrode to differ from the original AC signal generated by the oscillation circuit. The current and the phase differential are compared with stored values to accurately identify whether or not an adult passenger is seated in the front passenger seat. This determination is transmitted to a safety restraint device, such as an air bag control circuit, thereby controlling deployment of a passenger-side air bag only when an adult is seated in the front passenger seat.

FIGS. 1–5 disclose a passenger detection system in accordance with the second embodiment of the present invention, and a safety restraint system (SRS) incorporating the passenger detection system.

Figure 1:
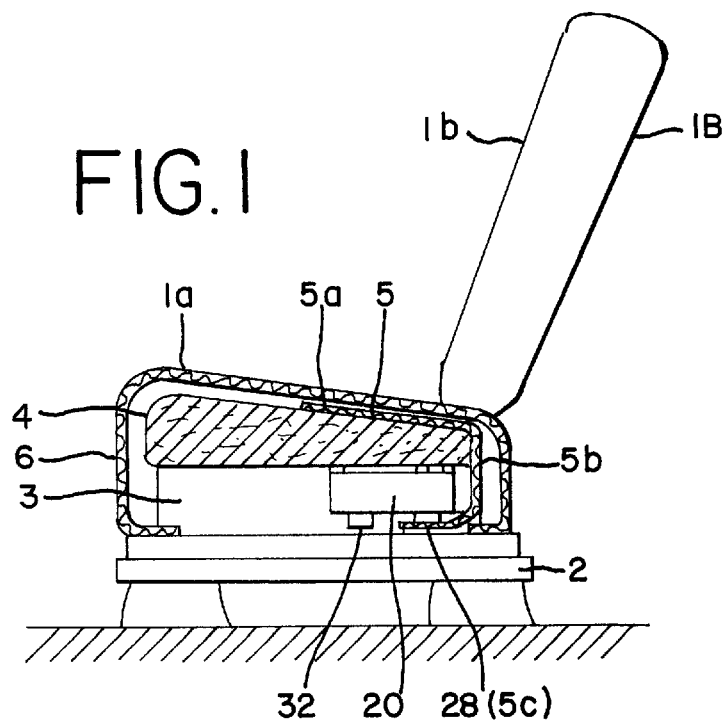
FIG. 1 is a cross-sectional side view of a seat incorporating the passenger detection system in accordance with a second embodiment of the present invention.

FIG. 1 is a cross-sectional side view showing a front passenger seat 1B incorporating the passenger detection system in accordance with the second embodiment. The seat 1B is generally composed of a base portion 1*a* and a back portion 1*b*. The base portion 1*a* includes a metal seat frame 3 mounted on a base 2 that can slide forward and backward relative to the automobile body, a cushion 4 supported on the seat frame 3, and covering material 6 covering the cushion 4 and the frame 3. The passenger detection system includes an antenna electrode 5 and a control unit 20. In the disclosed embodiment, the antenna electrode 5 is positioned between the cushion 4 and the covering material 6, extends downward along a rear portion of the cushion 4 and is connected to the control unit 20. Alternatively, a portion of the antenna electrode 5 can be located on or outside (on top of) the covering material 6. As used herein, the phrase "mounted on a surface of the seat" is intended to describe both of these embodiments. The control unit 20 is located within the seat 1B, for instance in the seat frame 3, and is connected to the electrode 5. Alternatively, the control unit 20 may be located on the automobile body.

Figure 2A:
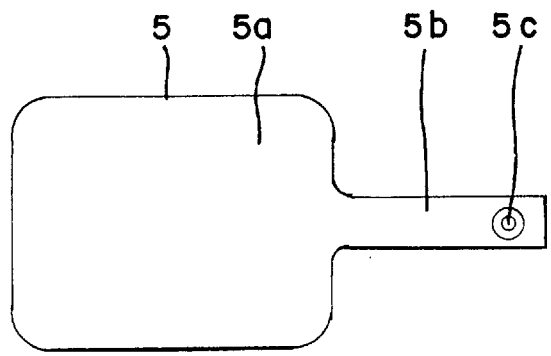
FIGS. 2(a) and 2(b) are a top view and a partial cross-sectional side view an antenna electrode of the passenger detection system in accordance with the second embodiment.
Figure 2B:
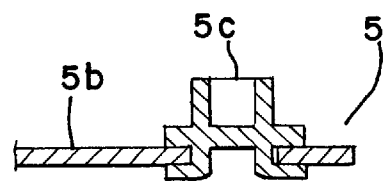

FIGS. 2(*a*) and 2(*b*) show the antenna electrode 5 in accordance with the second embodiment. The antenna electrode 5 is constructed from or incorporated into flexible material to provide seating comfort for the passenger. By way of example, the antenna electrode 5 can be composed of metal fibers sewn into the covering material 6 of the seat 1B, or conductive paint disposed on the surface of the covering material 6. Alternatively, the antenna electrode can be formed from a metal plate or foil located in the seat 1B. As shown in FIGS. 2(*a*) and 2(*b*), in accordance with the second embodiment, the antenna electrode 5 includes an antenna 5*a*, a conductor 5*b* formed by a narrow portion of the antenna 5*a*, and a connector 5*c*, which is electrically connected to the conductor 5*b*. The antenna 5*a* is positioned adjacent to the upper surface of the base portion 1*b* of the seat 1B. The conductor 5*b* extends downward from the antenna 5*a* along the back portion of the cushion 4 to the seat frame 3. The connector 5*c* connects the conductor 5*b* to a connector 28 of the control unit 20. In addition to the structure shown in FIG. 2(*b*), the connector 5*c* may be formed from hooks, pins, jack clamps or other convenient connecting structures.

FIGS. 3(*a*) and 3(*b*) are block diagrams showing portions of a safety restraint system (SRS) incorporating the passenger detection system in accordance with the second embodiment. In particular, FIG. 3(*a*) shows the control unit 20 of the passenger detection system, and FIG. 3(*b*) shows an air bag control system connected to receive detection signals from the control unit 20.

Referring to FIG. 3(*a*), the control unit 20 generally includes an oscillation circuit (21, 22), a current detection circuit 25, a phase differential detection circuit 29, and a control circuit 31. The oscillation circuit generates an output signal that is transmitted to the antenna electrode 5 (through the connector 28, as shown in FIG. 4) causing emission of a minute electric field in the vicinity of the antenna electrode 5. The current detection circuit 25 is connected between the oscillation circuit and the antenna electrode 5, and generates a current signal indicating the amount of current flowing between the oscillation circuit and the antenna electrode 5. The phase differential detection circuit 29 is connected to a first node located between the oscillation circuit and the current detection circuit 25, and a second node located between the current detection circuit 25 and the antenna electrode 5 (through the connector 28). The phase differential detection circuit 29 generates a phase differential signal indicating a phase difference between the oscillation circuit output signal and the signal generated on the antenna electrode 5. The control circuit 31 determines the presence of a passenger in the front passenger seat 1B in response to the current and phase differential signals. When an adult passenger is detected, the control circuit 31 transmits a detection signal to a safety restraint system (SRS), such as an air bag control system 18, that is utilized to initiate a safety restraint operation (i.e., to enable deployment of an air bag during a collision). Conversely, when an adult passenger is not detected, the control circuit 31 transmits a non-detection signal that, for example, disables the air bag control system 18 (i.e., prevents deployment of the air bag during a collision).

The oscillation circuit of control unit 20 includes an oscillator 21 and an amplitude control circuit 22. The oscillator 21 generates a 5 to 12 volt output signal having a frequency of approximately 100 kHz that is transmitted to the amplitude control circuit 22. The amplitude control circuit 22 includes a phase differential circuit 23 and an amplitude detection circuit 24. The phase differential circuit 23 includes a variable amplitude circuit 23*a* comprising a programmable gain amplifier (PGA) that amplifies the oscillator output signal in accordance with a control signal transmitted from the control circuit 31, and generates the oscillation circuit output signal. The control signal from the control circuit 31 is generated in response to an input signal from the amplitude detection circuit 24 that is connected to the output of the variable amplification circuit 23*a*. The amplitude detection circuit 24 includes a detector 24*a* (e.g., an operational amplifier or other amplifying circuit), an AC-DC conversion circuit 24*b* for converting the output signal from the detector 24*a* to a direct current signal, and an amplifier circuit 24*c* for amplifying the output from the AC-DC conversion circuit 24b. As discussed in further detail below, the control circuit 31 compares the output signal from the amplifier 24c with a stored value, and generates the control signal whose amplitude is used to control the oscillation circuit output signal generated by the variable amplification circuit 23a. The oscillation circuit output signal is transmitted from the amplitude control circuit 22 to the antenna electrode 5 through the current detection circuit 25.

In the disclosed embodiment, the oscillation circuit output signal the amplitude control circuit 22 adjusts the output signal from the oscillator 21 such that the oscillation circuit output signal is maintained at a constant voltage level. In another embodiment the amplitude control circuit 22 may be omitted if the oscillator 21 generates a suitably stable output signal.

Referring again to FIG. 3(a), the current detection circuit 25 includes an impedance or resistance element 25a and a differential amplifier (or other amplifier) 25b whose output is transmitted to the control circuit 31 through an AC-DC conversion circuit 26 and an amplifier 27. One such impedance/resistance element 25a is a RR1220P-103-D, manufactured by Susumukougyou of Japan, that is connected between the output of the amplification control circuit 22 and the antenna electrode 5 (through the terminal 28). The differential amplifier 25b is connected across the impedance/resistance element 25a and generates the current signal based on the voltage differential across the impedance/resistance element 25a. In particular, the current differential amplifier 25b compares the voltage level of the oscillation circuit output signal with the voltage level generated on the antenna electrode 5, and generates the current signal that indicates the difference. The current signal output from current detection circuit 25 is transmitted to an AC-DC conversion circuit 26 that converts the current signal from alternating current (AC) to direct current (DC). The DC current signal output from AC-DC conversion circuit 26 is transmitted to the control circuit 31 through the amplifier 27.

The oscillation circuit output signal is also transmitted to a first input of the phase differential detection circuit 29, which also includes a second input connected to the antenna electrode 5 through the connector 28. The phase differential detection circuit 29 generates a phase differential signal indicating a difference between the phase of the oscillation circuit output signal and the phase of the signal generated on the antenna electrode 5. The phase differential signal is transmitted to the control circuit 31 through an amplifier 30.

Figure 5A:
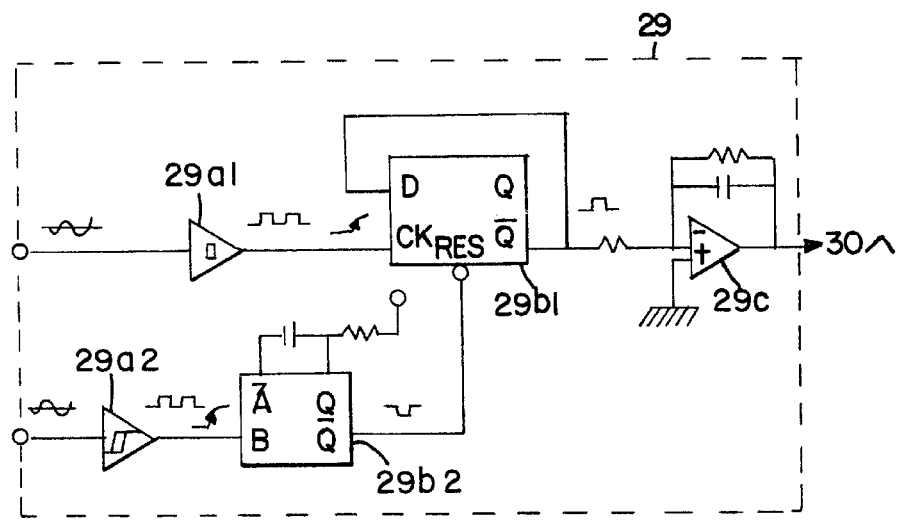
FIG. 5(a) is a simplified circuit diagram showing the phase differential detection circuit of the control unit shown in FIG. 3(a).
Figure 5B:
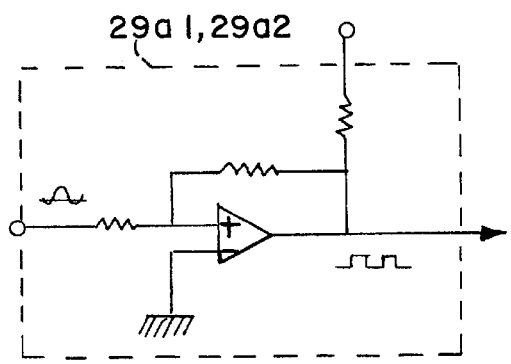
FIG. 5(b) is a simplified circuit diagram showing the wave form rectifier circuit of the control unit shown in FIG. 3(a).

As shown in FIG. 5(a), the phase differential detection circuit 29 includes wave rectifier circuits 29a1 and 29a2, a first flip flop circuit 29b1, a second flip flop circuit 29b2 and an integrating circuit 29c. The wave rectifier circuits 29a1 and 29a2 rectify the sine waves associated with the amplified output from the antenna electrode 5 and the oscillation circuit output signal, respectively. In one embodiment, the wave rectifier circuits 29a1 and 29a2 include an operational amplifier connected as shown in FIG. 5(b). The rectified square wave signals output from the wave rectifier circuits 29a1 and 29a2 are respectively transmitted to the CK input of the first flip flop 29b1 and the B input of the second flip flop 29b2. The high frequency oscillation circuit output signal is generated through switching action between the individual +5 V power sources. If the waveform of the oscillator 21 is square instead of sinusoidal, the wave rectifier circuits 29a1 and 29a2 can be omitted. The amplified DC current differential signal from amplifier 27 and the amplified phase differential signal from amplifier 30 are transmitted to the control circuit 31.

Referring again to FIG. 3(a), in addition to controlling the voltage amplitude generated by the oscillation circuit, the control circuit 31 receives the current signal and the phase differential signal, and transmits either a "deploy" control signal or a "do-not-deploy" control signal to the air bag control system 18 in accordance with the process disclosed below. One control circuit 31 that is suitable for providing these functions is a UPD78052GC manufactured by NEC of Japan. The control circuit 31 is also connected through a power supply circuit 33 and a connector 32 to the automobile battery (not shown).

Figure 3B:
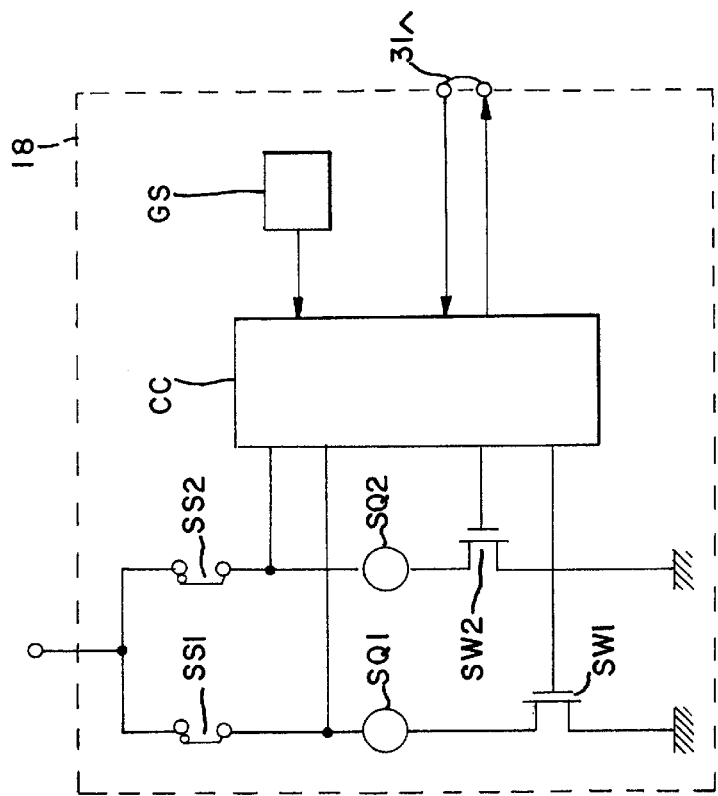
Figure 3A:
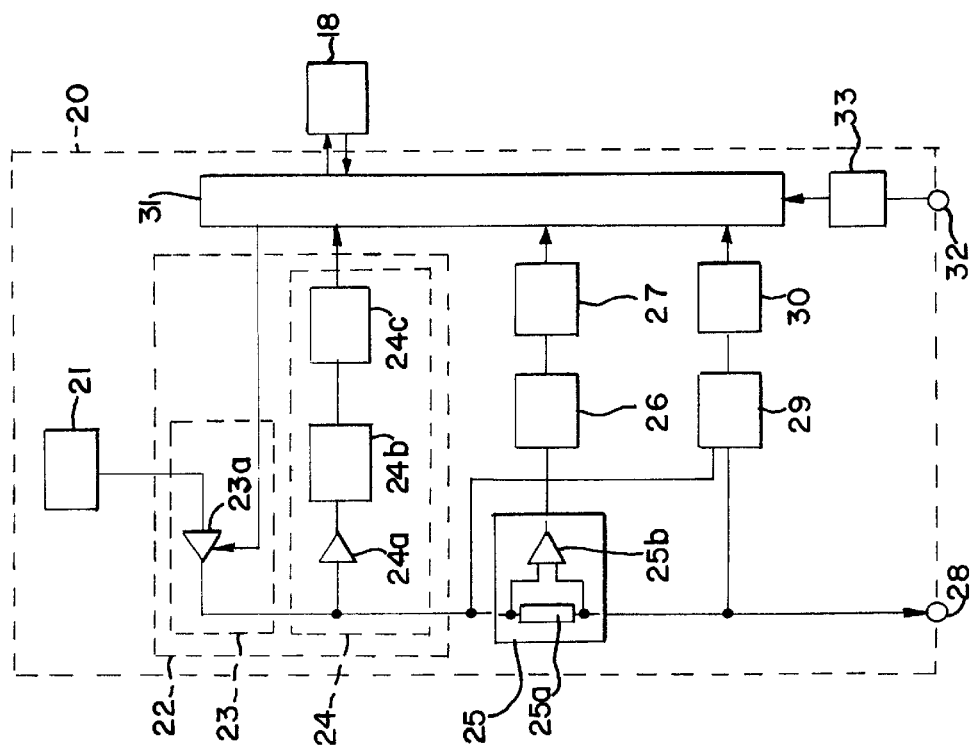
Figure 4:
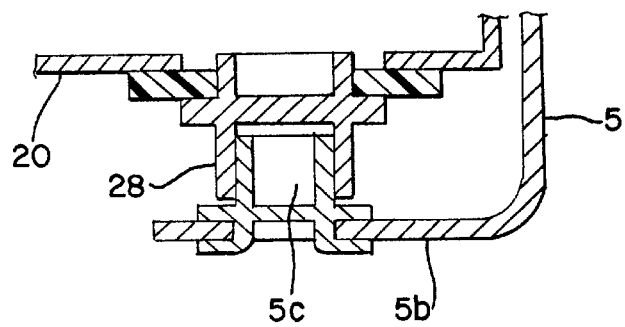
FIG. 4 is a cross-sectional view showing a connection between the antenna electrode shown in FIG. 2(a) and a control unit of the passenger detection system shown in FIG. 3(a).
Figure 14:
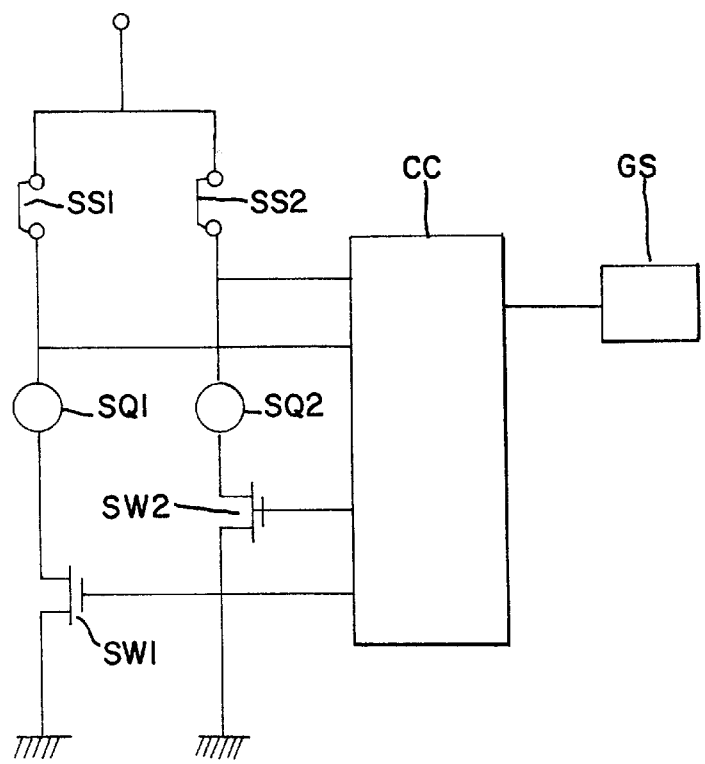
FIG. 14 is a simplified block diagram of a known air bag control system.
Figure 15A:
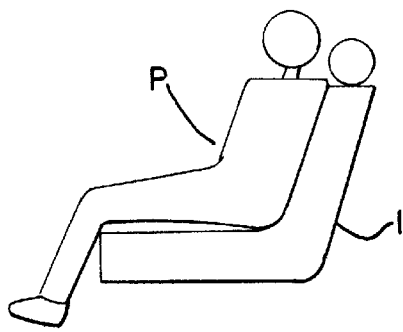
Figure 15B:
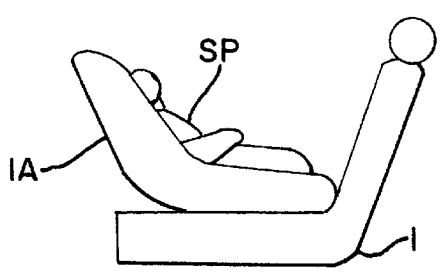
Figure 15C:
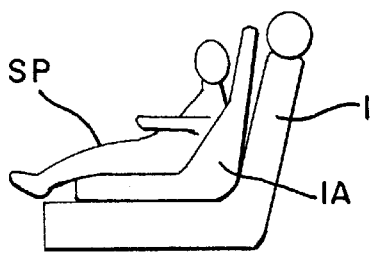
Figure 16:
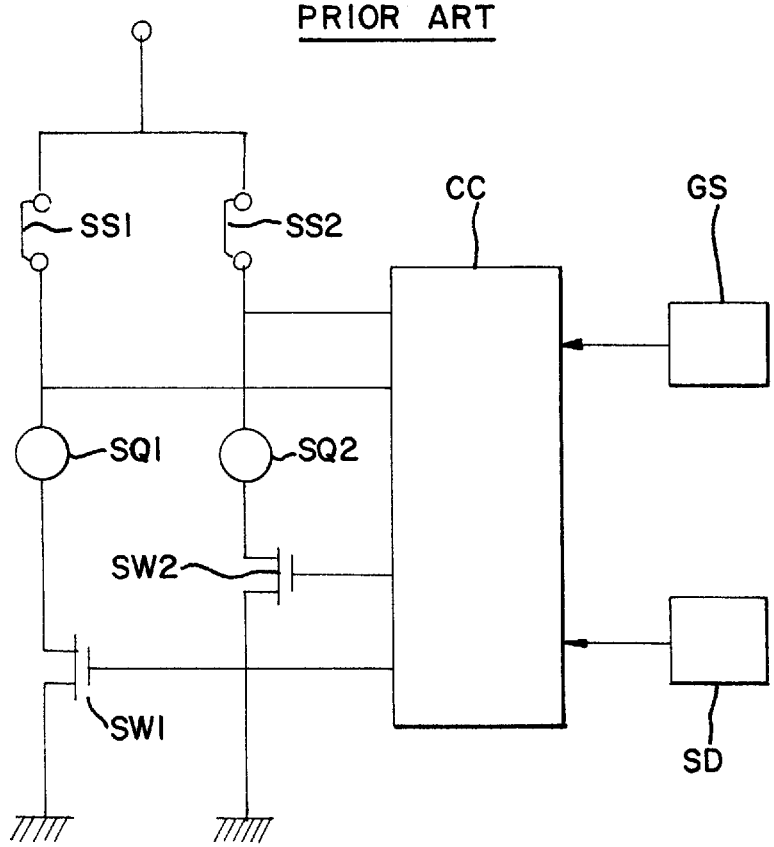
FIG. 16 is a simplified block diagram showing a second known air bag control system.

As shown in FIG. 3(b), the air bag control system 18 controls deployment of an air bag device in accordance with the control signal received from the control circuit 31. Operation of the control system 18 is otherwise identical to that of the control system discussed above with reference to FIGS. 14 and 17.

The passenger detection system according to the second embodiment functions as follows. First, a high frequency signal is transmitted from the oscillator 21 through the variable amplifier circuit 23a, and the resulting oscillation circuit output signal is detected by the detection unit 24a of the amplification detection circuit 24. The detected signal is then converted to direct current in the AC-DC conversion circuit 24b, and then amplified by the amplifier 24c and transmitted to the control circuit 31. In the control circuit 31, the detected voltage amplitude is compared against a stored amplitude value, and a variable amplitude signal is generated whose voltage level is determined by a difference between the detected signal and the stored value. The variable amplitude signal is output from the control circuit 31 to the phase differential circuit 23, which adjusts the voltage amplitude of the amplified signal output from the variable amplitude circuit 23a. In this way, the oscillation circuit output signal is adjusted to a predetermined amplitude. Thereafter, the continued operation of the variable amplitude circuit 23a and the amplitude detection circuit 24 maintain the oscillation circuit output signal at the predetermined amplitude.

The oscillation circuit output signal, its voltage amplitude now stabilized, is transmitted to the antenna electrode 5 through the current detection circuit 25 and the connector 28. As a result, a minute electric field is emitted in the area of the antenna electrode 5. The amount of current flowing from the oscillation circuit to the antenna electrode 5 is dependent upon whether or not a person is seated in the front passenger seat 1B. The amount of current flowing to antenna electrode 5 is at a first level when a passenger is seated in the seat 1B, and is at a relatively lower level when the seat 1B is unoccupied. The amplitude of this current is detected by the current detection circuit 25, and is converted into a DC signal by the AC-DC conversion circuit 26, amplified in the amplifier 27, and then transmitted to the control circuit 31.

Figure 6A:
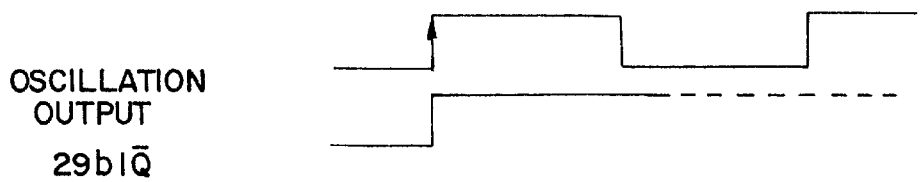
Figure 6B:
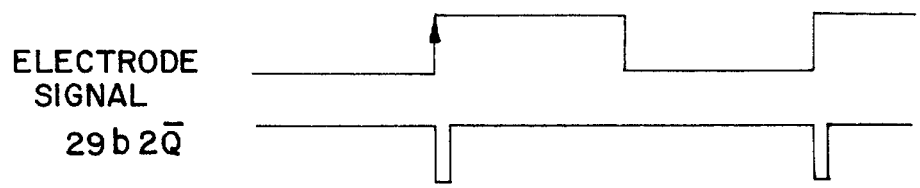
Figure 6C:
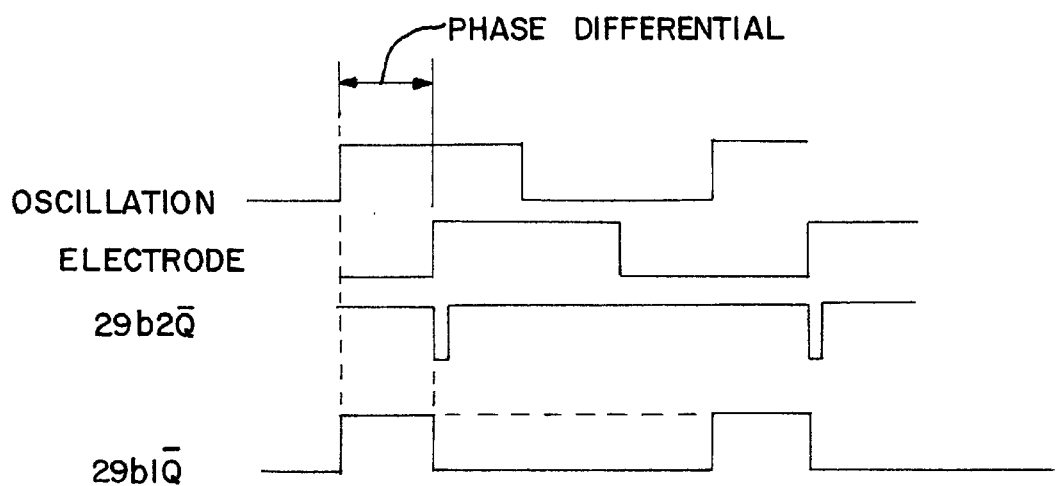

In addition, a phase difference between the oscillation circuit output signal and the signal on the antenna electrode 5 are measured across the impedance/resistance element 25a of the current detection circuit 25. The oscillation circuit output signal is transmitted to a first input of the differential potential detection circuit 29, and the received signal on antenna electrode 5 is applied to a second input of the differential potential detection circuit 29 through the connector 28. The sine waves of each signal are rectified to square waves by the wave form rectifier circuits 29a1 and 29a2, as shown in FIG. 5(a), which are then transmitted to the flip flop circuits 29b1 and 29b2. The rising edge (indicated by an arrow in FIG. 6(a)) of the square wave associated with the oscillation circuit output signal is detected by the clock terminal CK of the first flip flop circuit 29b1. In response, the first flip flop 29b1 generates a high output on the terminal Q bar. As shown in FIG. 6(b), the rising edge (indicated by an arrow) of the square wave associated with the signal on the antenna electrode 5 is detected by terminal B of the second flip flop circuit 29b2. In response, the second flip flop 29b2 generates a low output pulse from the terminal Q bar. The low output pulse from second flip flop 29b2 is transmitted to the reset terminal RES of the flip flop circuit 29b1, causing the output from the terminal Q bar of the first flip flop circuit 29b1 to change from high to low, as shown in FIG. 6(c). The length of the high output signal from the first flip flop circuit 29b1 indicates the amount of phase difference (phase differential) between the oscillation circuit output signal and the signal on the antenna electrode 5. It is converted to a voltage signal by the integrating circuit 29c, and is then input to the control circuit 31 through the amplifier 30.

A threshold value related to the current detected by the current detection circuit 25 when a person is seated in the seat 1B, as well as a threshold value related to the phase differential across the current detection circuit 25, are stored in the control circuit 31 (or in memory accessed by the control circuit 31) as threshold data. In the second embodiment, the phase differential threshold value is an experimentally-determined value representing the average between a phase differential detected when a passenger is seated in the seat 1B and a phase differential detected when something other than a person is in the seat 1B. The current threshold value is similarly determined. These threshold values are referred to herein as the "threshold value for recognizing that a person is seated". By comparing the threshold data related to the current and phase differential stored in the control circuit 31 with the detected current and phase differential data input from amplifiers 27 and 30, a precise determination about whether or not a passenger is seated in the seat 1B is possible. In particular, depending on the condition of the seat 1B (for instance, wet or dry), multiple threshold values, such as upper and lower limits, can be set. The flow process, to be described later, will be explained using an example with one threshold value. Note that the detection current of the current detection circuit 25 increases when a person is seated in the seat 1B. It decreases when luggage is in the seat, or when the seat is empty. In either case, there is a clear difference in the detected current level between these occupied and unoccupied conditions. The same is true for the phase differential.

When the control circuit 31 determines the presence or absence of a passenger, the relevant data is sent to the air bag device 18 shown in FIG. 3(b). For instance, when the detected phase differential and current are consistent with experimentally-determined values indicating that the front passenger seat is empty, indicating that luggage is placed on the seat, or indicating that the seat is wet, then the control circuit 31 sends a "do-not-deploy" signal to the air bag device 18. When the detected phase differential and current are consistent with values indicating that a passenger is in the seat, then the control circuit 31 sends a "deploy" signal to the air bag 18. The control circuit CC of the air bag 18 receives either the "do-not-deploy" signal or the "deploy" signal. When the "do-not-deploy" signal is received, the control circuit CC is set so as not to provide a gate signal to the semiconductor switching element SW2 for the front passenger seat during a collision. Note that the gate signal is provided to the semiconductor switching element SW1 for the driver's seat. When the "deploy" signal is received, the control circuit CC is set to provide the gate signal to both the semiconductor switching elements SW1 and SW2 during a collision.

Next the process flow for the passenger detection system according to the second embodiment will be explained with reference to FIGS. 7 to 10.

Figure 7:
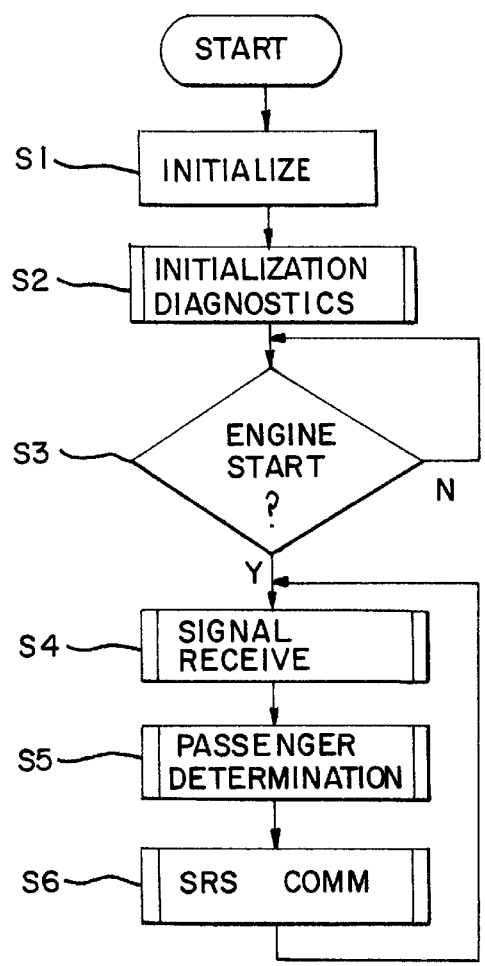
FIG. 7 is a flow diagram showing a method for detecting passengers using the passenger detection system in accordance with the second embodiment of the present invention.

Referring to FIG. 7, the process is initiated when a driver sets to the ignition switch of the automobile housing the passenger detection system ON. The process begins by initializing the passenger detection system (Step S1) and then proceeds to Step S2. In Step 2, initialization diagnostics for the communications system linking the control circuit 31 and the air bag device 18 are performed. Next, a determination as to whether or not the automobile engine is started is performed in Step S3. If the engine is determined to have started, the process moves to Step S4. If the engine is determined not to have started, the process returns to Step S3. Signal data related to the current flowing to the antenna electrode 5 detected by the current detection circuit 25, as well as signal data related to the phase differential detected by the phase differential detection circuit 29, are received by the control circuit 31 in Step S4. Then, based on this received data, the control circuit 31 determines the occupation status of the passenger seat 1B in Step 5. Next, in Step S6, STS communications with the air bag device (SRS) 18 is performed based on the results of the determination made in Step S5. When step S6 is completed, the process returns to Step S4, and the process from Step S4 through Step S6 is repeated. Note that Step S3 can be omitted.

Figure 8:
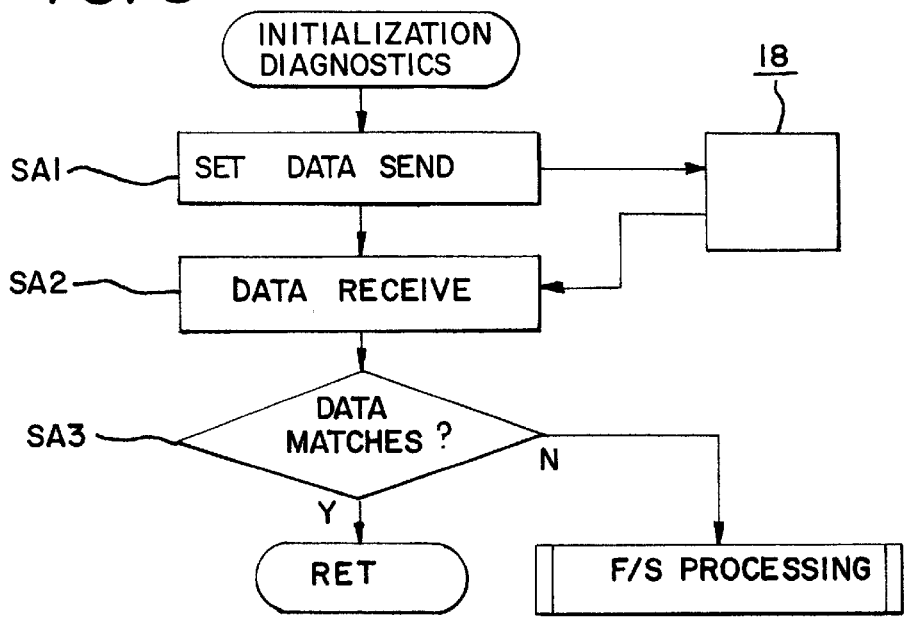
FIG. 8 is a flow diagram showing the initialization process utilized in the method shown in FIG. 7.

The initialization diagnostics process that takes place in Step 2 is shown in additional detail in FIG. 8. First, in Step SA1, predetermined data is sent from the control circuit 31 of the passenger restraint system to the control circuit CC of the air bag device 18. In Step SA2, the data is transmitted back from the air bag device 18 to the control circuit 31. Then, in Step SA3, the predetermined data sent from the control circuit 31 to the air bag device 18 and the data received from the air bag device 18 are compared. If the respective data matches, the process flow continues (RET). If the respective data is determined not to match, this is interpreted by the control circuit 31 to mean that there is an abnormality in the communications system, and a fail-safe process is performed, such as turning on a warning light. Note that the control circuit CC of the air bag device 18 can perform successful transmission of the predetermined data from the control circuit 31 to the air bag device 18.

Figure 9:
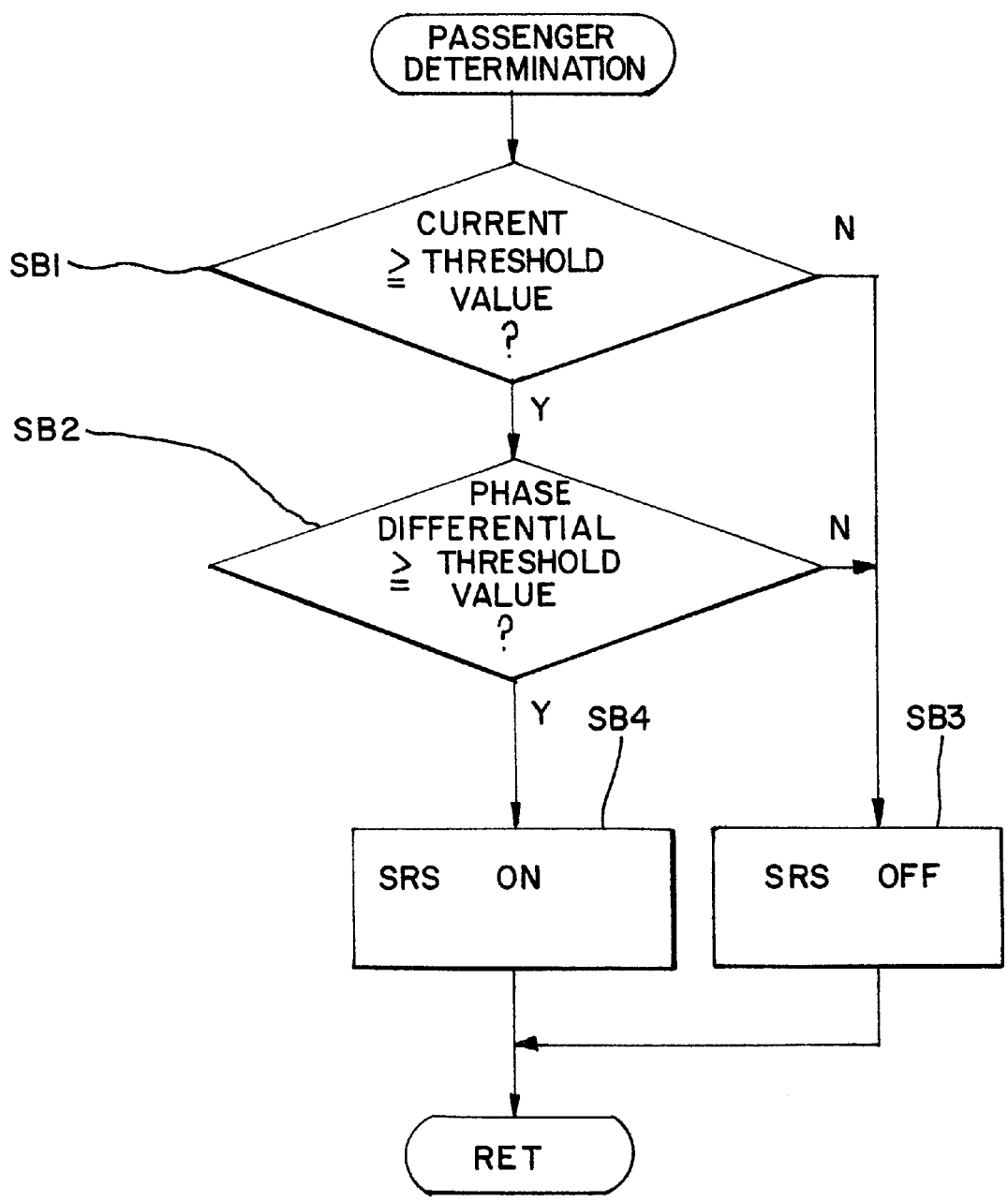
FIG. 9 is a flow diagram showing a process for determining the presence of passengers that is utilized in the method shown in FIG. 7.

The passenger determination process (Step S5) is shown in additional detail in FIG. 9. In Step SB1, the current data related to the current detected by the current detection circuit 25 is compared with the stored current threshold value by the control circuit 31. If the current data is greater than or equal to the threshold value (e.g., because a passenger is seated in the seat 1B), the process moves ahead to Step SB2. Conversely, if the current data is less than the threshold value, the process moves to Step SB3. In Step SB2, the phase differential data related to the phase differential across current detection circuit 25 is compared with the stored phase differential threshold value by the control circuit 31. If the phase differential data is greater than or equal to the threshold value (e.g., because a passenger is seated in the seat 1B), the process moves ahead to Step SB4. Conversely, if the phase differential data is less than the threshold value in Step SB2, the process moves to Step SB3. In Step SB3, the control circuit 31 is set for transmission of the "do-not-deploy SRS" (SRS OFF) signal to the air bag device (SRS) 18. In other words, if either the current data is less than the current threshold value, or the phase differential data is less than the phase differential threshold value, then the control circuit 31 transmits the "do-not-deploy SRS" signal to the air bag circuit 18. Conversely, in Step SB4, if both the current data is greater than or equal to the current threshold value, and the phase differential data is greater than or equal to the phase differential threshold value, then the control circuit 31 is set for transmission of the "deploy SRS" (SRS ON) signal to the air bag circuit 18.

Figure 10:
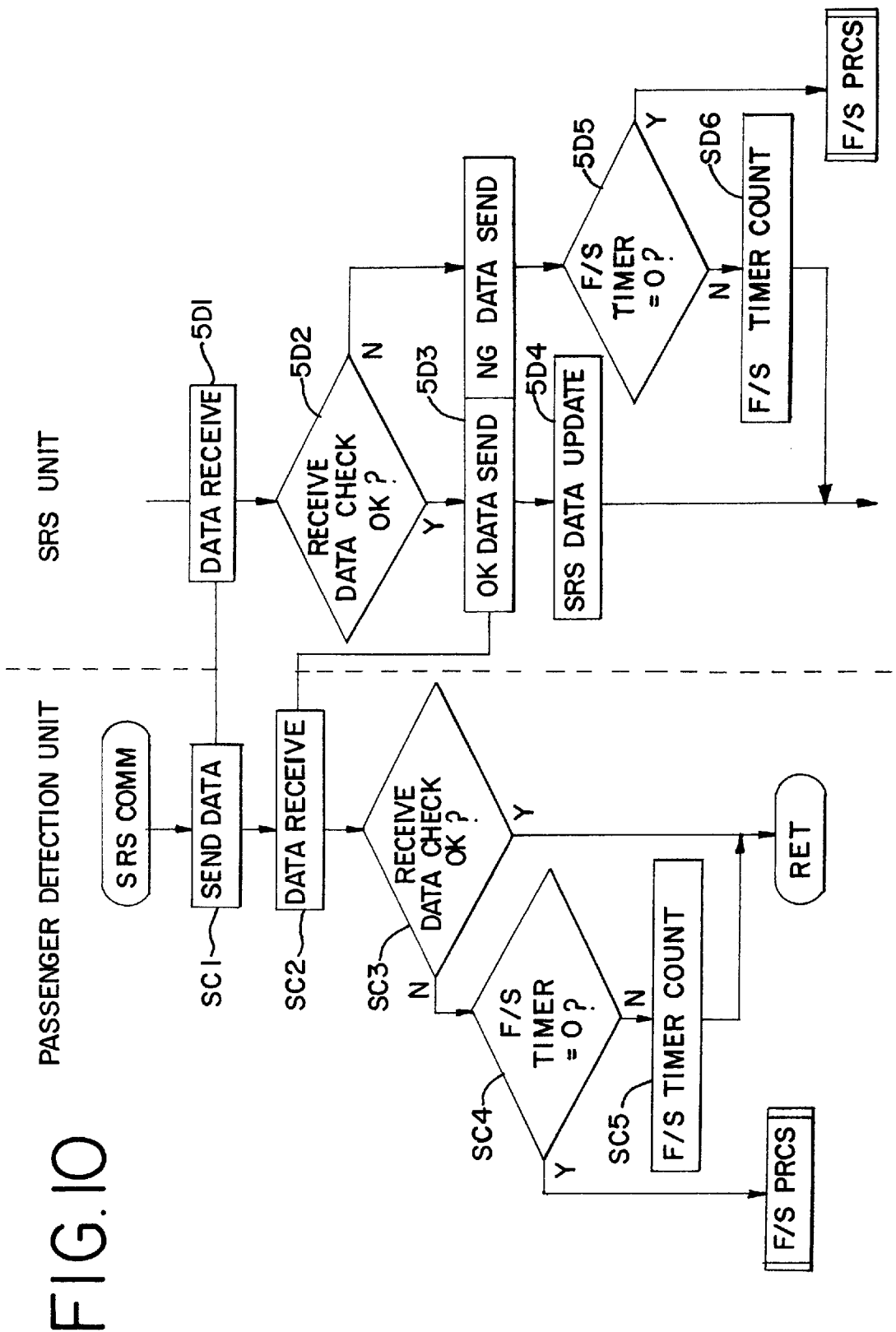
FIG. 10 is a flow diagram showing a safety restraint system (SRS) communication process utilized in the method shown in FIG. 7.

The SRS data communications process (Step S6) is shown in additional detail in FIG. 10. Referring to the left (Passenger Detection System) side of FIG. 10, processes performed in the passenger detection system will now be described. In Step SC1, check data and either the "deploy SRS" signal or the "do-not-deploy SRS" signal (depending upon the setting generated in the passenger determination process) are transmitted from the passenger detection unit (i.e., the control circuit 31) to the air bag device 18 (i.e., the control circuit CC). As discussed below, the air bag device 18 either confirms successful transmission of the check data and the "deploy SRS" signal or the "do-not-deploy SRS" signal, or indicates that the transmission was not successful. The control circuit 31 in Step SC2 receives this transmission from the air bag device 18. The process then moves to Step SC3. In Step SC3, the control circuit 31 determines whether or not a transmission was sent from the air bag device 18 to the passenger detection system, and whether the transmission from the air bag device 18 indicates proper transmission of the originally-transmitted data. If the transmission from the air bag unit 18 indicates correct data (i.e., no abnormalities occurred in the communications system), the process flow continues (RET). If an abnormality is discovered in the communications system (i.e., either no data is received from the air bag device 18, or air bag device 18 transmits an error message), the process moves to Step SC4. In Step SC4, a determination is made to see if the fail-safe timer (F/S timer) has counted down to zero following the original transmission from the control circuit 31 to the air bag device 18. Note that detection of abnormalities in the communications system is performed three times, for instance. Therefore, if the fail-safe timer is determined to have reached zero, fail-safe processing is performed, such as activating a warning light. In addition, if the fail-safe timer is determined not to be at zero, the process proceeds to Step SC5. The fail-safe timer count is performed, and the process flow continues.

Referring to the right (SRS) side of FIG. 10, processes performed in the air bag device (SRS) will now be described. In Step SD1, the air bag unit (i.e., the control circuit CC) receives check data as well as SRS ON/OFF data from the passenger detection unit (control circuit 31). In Step SD2, the received data is checked to determine whether or not the transmitted data was received properly. Regardless of whether the transmitted received data was received properly (Y) or not (N) in Step SD2, the process moves to Step SD3. In Step SD3, the received check data and either "transmission OK" data or "transmission no good (NG)" data are sent to the passenger detection unit. In particular, if no abnormality is found in Step SD2, the "transmission OK" data is sent in Step SD3, and the process moves to Step SD4, wherein the deployment/idle condition of the air bag unit 18 is updated based on the SRS ON/OFF data transmitted from the passenger detection unit. If, however, an abnormality is found in the communications system in Step SD2, the "transmission NG" data is sent to the passenger detection unit in Step SD3, and the process moves to Step SD5. In Step SD5, a determination as to whether or not a fail-safe timer has reached zero is made. Note that the detection of abnormalities in the communications system is performed three times. Therefore, if the fail-safe timer is determined to have reached zero, fail-safe processing is performed, such as activating a warning light. In addition, if the fail-safe timer is determined not to be at zero, the process proceeds to Step SD6. In Step SD6, the fail-safe timer count is performed, and the process flow continues.

In the second embodiment, a minute electric field is created in the area around the antenna electrode 5 as a result of the high frequency signal provided to the antenna electrode 5 from the oscillation circuit. The current flowing in the antenna electrode 5 in response to this minute electric field differs depending on what object is present in the seat 1B. In particular, the current will have a difference in level that can be detected by comparing the detected current with stored threshold values indicative of a person, as opposed to something else. Therefore, by detecting the current that is flowing to the antenna electrode 5 through the current detection circuit 25, the presence or absence of a passenger seated in the seat 1B can be readily determined.

In addition, the phase differential measured across the impedance element 25a of the current detection circuit 25 between the oscillation circuit output signal and the signal on the antenna electrode 5 will differ depending on what object is present in the seat 1B. In particular, a phase differential indicating the presence of a passenger in the front passenger seat 1B can be detected by comparing the detected phase differential with stored threshold values indicative of a person, as opposed to something else. Therefore, by detecting the phase differential in the phase differential detection circuit 29, the presence or absence of a passenger seated in the seat 1B can be readily determined.

Because the antenna electrode 5 is composed of a single (integral) unit, the circuit is simpler and costs are lower as compared to systems utilizing multiple electrodes.

Because the voltage amplitude of the signal transmitted to the antenna electrode 5 can be controlled so as to be steady, a simple comparison of the data related to the current through the current detection circuit 25 and the threshold value stored in the control circuit 31 allows for reliable and very precise determination.

The control circuit 31 detects the presence or absence of a passenger in the seat 1B and then controls the air bag unit 18 so that it will operate when a person (such as an adult) is seated in the front passenger seat without the use of an RFIS or FFCS. As a result, the safety of passengers when the automobile is being operated is greatly increased. The air bag unit 18 does not operate when the seat 1B is empty or when, for example, luggage is placed on it. As a result, unwanted air bag deployment is avoided when the automobile is in a collision.

The conductor 5b is formed from a part of the antenna 5a of the antenna electrode 5. The connector 5c attached to the conductor 5b is connected to the connector 28 of the control unit 20 positioned in the seat 1B. Therefore, the aforementioned antenna electrode 5 is unified and the circuit structure is simplified, resulting in an effective decrease in the cost of the system.

Figure 11:
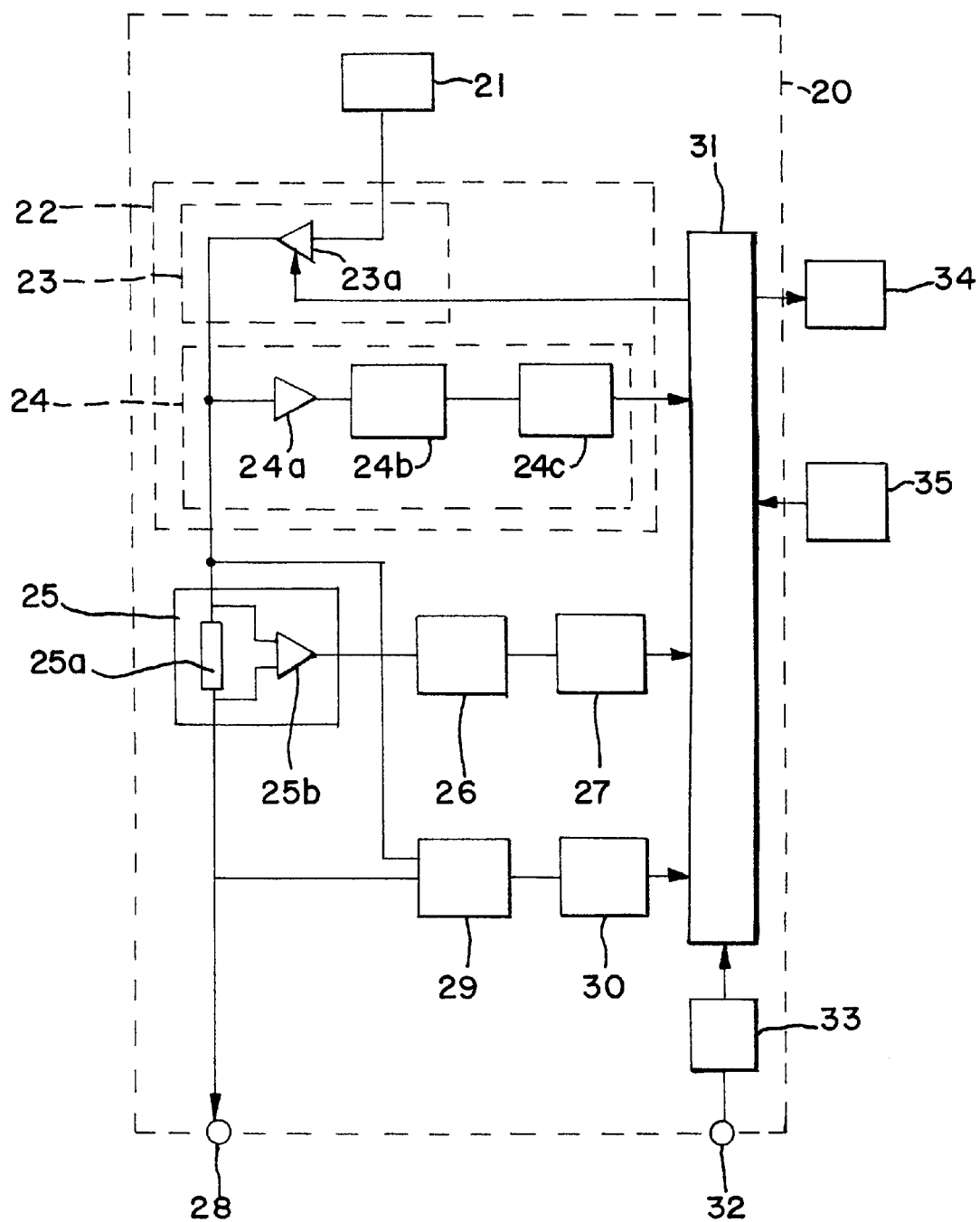
FIG. 11 is a simplified block diagram showing a safety restraint system incorporating a passenger detection system in accordance with a third embodiment of the present invention.

FIG. 11 shows a passenger detection system in accordance with a third embodiment of the present invention. The third embodiment is fundamentally the same as that of the second embodiment shown in FIG. 3(*a*) with the following differences. Specifically, instead of the air bag unit 18, a safety restraint system (SRS) comprising a warning light 34 and a seat belt detection circuit 35 are connected to the control circuit 31 of the control unit 20. Note that the air bag unit 18 can also be used.

In accordance with the third embodiment, when the passenger detection unit determines that a passenger is seated in the seat 1B based on the current data and the phase differential data transmitted to the control circuit 31, the seat belt detection circuit 35 determines whether or not the passenger has put on the seat belt. If the seat belt detection circuit 35 detects that the passenger has not put on the seat belt, the control circuit 31 outputs an alarm signal to the seat belt warning light 34 and causes the light to flash. Conversely, if the detection results show that the passenger has put on the seat belt, no warning signal is output to the warning light 34, and the warning light does not flash. Furthermore, if a person is not seated in the seat 1B, the seat belt warning light 34 does not function, regardless of the output signal from the seat belt detection circuit 35. Note that if an object other than a person, such as a suitcase, is placed in the front passenger seat, the detected current will be lower than that normally indicative of a person. As a result, the amount of current detected by the current detection circuit 25 and the phase differential detected by the phase differential detection circuit 29 will be lower as compared to when a person is seated in the seat, and the passenger detection unit will determine that a person is not seated in the seat 1B.

In accordance with the third embodiment, the control circuit 31 outputs a warning signal to the seat belt warning light 34 when the seat belt is not in use and a person is seated in the seat 1B, based on the passenger detection results and the seat belt use status. As a result, a warning light will come on that is visible to the passenger. This promotes the use of seat belts, thereby improving safety when the automobile is in use.

FIG. 12 shows a passenger detection system in accordance with a fourth embodiment of the present invention. The fourth embodiment is fundamentally the same as the second embodiment, described above, with the following differences. Specifically, virtually all of the base of the seat 1B is covered by the antenna part 5a of the antenna electrode 5, the conductor 5b extends from the front of the cushion 4 to the seat base 2, and the conductive connector 5c is connected to the connector 28 of the control unit 20 near the front of the seat 1B.

In accordance with the fourth embodiment, the area covered by the antenna electrode 5 is larger than in the second and third embodiments. As a result, enhanced current and phase differential data is generated that prevents false passenger detection due to, for example, water on the seat 1B. In addition, the enhanced current and phase differential data provide a more reliable means for distinguishing between a passenger and other objects, such as luggage.

FIGS. 13(*a*) and 13(*b*) show a passenger detection system in accordance with a fifth embodiment of the present invention. The basic structure associated with the fifth embodiment is the same as that of the second embodiment, described above, with the following differences. Specifically, an antenna electrode 5A includes a first portion 5a1 positioned in the base 1a of the seat 1C, a second portion 5a2 positioned in the back 1b of the seat 1C, a conductor 5b which is formed from a portion of the antenna portion 5a1, and a connector 5c which is mounted on the conductor 5b. The conductor 5b extends downward from the portion 5a1 along the side of the seat 1C to the control unit 20, and the connector 5c is connected to the control unit 20.

In accordance with the fifth embodiment, the area of the antenna electrode 5A is larger, resulting in improvements in the sensitivity of passenger detection. Note that the area of the antenna portion 5a1 and the antenna portion 5a2 can be changed as appropriate for the seat.

The present invention is not limited to the embodiments provided above. For instance, in addition to being rectangular, the shape of the antenna electrode in the seat could be any many-sided shape or a circle, ellipse, or square. In addition, in the disclosed embodiments the antenna and the conductor are composed of two pieces. Alternatively, the antenna and the conductor can integrally formed, or the conductor can be replaced with a wire harness. Moreover, the frequency of the signal output from the oscillation circuit can be set to something other than 100 kHz, depending on the object to be detected. In addition, the voltage amplitude of the signal can be outside the range of 5 to 12 volts, and the output wave form can be a wave form other than a sine wave. Furthermore, the connection between the air bag unit and the seat belt status can be omitted.

As described above, in accordance with the present invention a minute electric field is emitted around the antenna electrode using high frequency voltage provided from the oscillation circuit to the antenna electrode. The current generated in the antenna electrode in response to this minute electric field will differ depending on what object is present in the seat. The difference in the current level can be determined by comparing the detected current with predetermined current values associated with a person, as opposed to something else. Therefore, by detecting the current that is flowing through the current detection circuit, the presence or absence of a passenger seated in the seat can be readily determined.

Moreover, the phase difference between the output signal from the oscillation circuit and received signal in the antenna electrode will differ depending on the presence of an object in the seat. This difference in the phase differential level can be determined by comparing the detected phase difference with stored values associated with a person (such as an adult), as opposed to a child in a FFCS, an infant in an RFCS, or something else. Therefore, by detecting the phase differential in the phase differential detection circuit, it is possible to more precisely determine whether or not a passenger is seated in the seat, when compared with a determination based only on the signal data related to the detection current.

In addition, structuring the antenna electrode so that it is connected to the control unit with the antenna positioned in the seat, in addition to having a part of the antenna electrode rolled-out into a conductor, allows for the complete elimination of the harness which connects the antenna electrode and the control unit. As a result, the antenna electrode structure is unified and the circuit structures are simplified, allowing for an effective reduction in the cost of the system.

We claim:

1. A passenger detection system comprising:
   a seat,
   at least one antenna electrode mounted on a surface of the seat,
   an oscillation circuit for transmitting an alternating current output signal to the antenna electrode, thereby generating an electric field adjacent to the antenna electrode,
   a current detection circuit connected between the oscillation circuit and the antenna electrode for generating a current signal indicating an amount of current flowing from the oscillation circuit to the antenna electrode,
   a phase differential detection circuit connected to the oscillation circuit and to the antenna electrode for generating a phase differential signal indicating a difference between a phase of the output signal sent from the oscillation circuit and a phase of the signal on the antenna electrode, and a control circuit for generating a safety restraint system control signal in response to the current signal and the phase differential signal.

2. A passenger detection system according to claim 1, wherein the oscillation circuit, the current detection circuit, the phase differential detection circuit, and the control circuit are mounted in a single housing attached to the seat.

3. A passenger detection system according to claim 1, wherein the phase differential detection circuit includes a first wave rectifier connected to the oscillation circuit, a first flip flop circuit having a first input terminal connected to an output of the first wave rectifier, a second wave rectifier connected to the antenna electrode, a second flip flop having an input terminal connected to an output of the second wave rectifier and an output terminal connected to a second input terminal of the first flip flop circuit, and an integrating circuit connected to an output of the first flip flop circuit.

4. A passenger detection system according to claim 3, wherein a rising edge of the output signal from the first wave rectifier causes the first flip flop circuit to generate a high output signal, and a rising edge of the output signal from the second wave rectifier is inverted by the second flip flop such that the first flip flop is switched to generate a low output signal.

5. A passenger detection system according to claim 3, wherein a falling edge of the output signal from the first wave rectifier causes the first flip flop circuit to generate a high output signal, and a falling edge of the output signal from the second wave rectifier is inverted by the second flip flop such that the first flip flop is switched to generate a low output signal.

6. A passenger detection system according to claim 1, wherein the oscillation control circuit comprises a variable oscillation circuit that alters the voltage amplitude of the output signal in response to a amplitude adjustment control signal, and a detection circuit for detecting the voltage amplitude output from the variable oscillation circuit, wherein the detection circuit transmits a voltage amplitude signal to the control circuit, and the control circuit generates the amplitude adjustment control signal in accordance with a comparison between the voltage amplitude signal and a stored value such that the variable oscillation circuit generates an output signal having a predetermined voltage amplitude.

7. A passenger detection system according to claim 1, wherein the antenna electrode includes an antenna having a first portion mounted on a base portion of the seat and a second portion mounted on a back portion of the seat, a conductor formed from a part of the first portion of the antenna, and a connector mounted on the conductor.

8. A passenger detection system according to claim 1, wherein a connecting structure is connected between the current detection circuit and the antenna electrode.

9. A passenger detection system according to claim 1, wherein the control circuit compares the current signal with a first threshold value and the phase differential signal with a second threshold value, and generates a safety restraint system control signal when the current signal is greater than the first threshold value and the phase differential signal is greater than the second threshold value.

10. A passenger detection system comprising:
a seat,
at least one antenna electrode mounted on a surface of the seat,
an oscillator for generating an alternating current (AC) signal,
an amplitude control circuit for adjusting a voltage amplitude of the AC signal in response to an amplitude adjustment control signal such that the voltage amplitude is maintained at a predetermined value, wherein the adjusted AC signal is transmitted from the amplitude control circuit to the antenna electrode, thereby causing the antenna electrode to generate a minute electric field,
a current detection circuit connected between the amplitude control circuit and the antenna electrode for generating a current signal indicating an amount of current flowing from the amplitude control circuit to the antenna electrode,
a phase differential detection circuit connected to the amplitude control circuit and to the antenna electrode for generating a phase differential signal indicating a difference between a phase of the adjusted AC signal sent from the amplitude control circuit and a phase of the signal on the antenna electrode, and
a control circuit for generating the amplitude adjustment control signal, and for generating a safety restraint system control signal in response to the current signal and the phase differential signal.

11. A passenger detection system according to claim 10, wherein the oscillator, the amplitude control circuit, the current detection circuit, the phase differential detection circuit, and the control circuit are mounted in a single housing attached to the seat.

12. A passenger detection system according to claim 10, wherein the phase differential detection circuit includes a first wave rectifier connected to the oscillation circuit, a first flip flop circuit having a first input terminal connected to an output of the first wave rectifier, a second wave rectifier connected to the antenna electrode, a second flip flop having an input terminal connected to an output of the second wave rectifier and an output terminal connected to a second input terminal of the first flip flop circuit, and an integrating circuit connected to an output of the first flip flop circuit.

13. A passenger detection system according to claim 12, wherein a rising edge of the output signal from the first wave rectifier causes the first flip flop circuit to generate a high output signal, and a rising edge of the output signal from the second wave rectifier is inverted by the second flip flop such that the first flip flop is switched to generate a low output signal.

14. A passenger detection system according to claim 12, wherein a falling edge of the output signal from the first wave rectifier causes the first flip flop circuit to generate a high output signal, and a falling edge of the output signal from the second wave rectifier is inverted by the second flip flop such that the first flip flop is switched to generate a low output signal.

15. A passenger detection system according to claim 10, wherein the oscillation control circuit comprises a variable oscillation circuit that alters the voltage amplitude of the output signal in response to a amplitude adjustment control signal, and a detection circuit for detecting the voltage amplitude output from the variable oscillation circuit, wherein the detection circuit transmits a voltage amplitude signal to the control circuit, and the control circuit generates the amplitude adjustment control signal in accordance with a comparison between the voltage amplitude signal and a stored value such that the variable oscillation circuit generates an output signal having a predetermined voltage amplitude.

16. A passenger detection system according to claim 10, wherein the antenna electrode includes an antenna having a first portion mounted on a base portion of the seat and a second portion mounted on a back portion of the seat, a conductor formed from a part of the first portion of the antenna, and a connector mounted on the conductor.

17. A passenger detection system according to claim 10, wherein a connecting structure is connected between the current detection circuit and the antenna electrode.

18. A passenger detection system according to claim 10, wherein the control circuit compares the current signal with a first threshold value and the phase differential signal with a second threshold value, and generates a safety restraint system control signal when the current signal is greater than the first threshold value and the phase differential signal is greater than the second threshold value.

* * * * *